US006594991B2

United States Patent
Itoh et al.

(10) Patent No.: US 6,594,991 B2
(45) Date of Patent: Jul. 22, 2003

(54) EXHAUST PURIFYING METHOD AND APPARATUS OF AN INTERNAL COMBUSTION ENGINE

(75) Inventors: Kazuhiro Itoh, Mishima (JP); Toshiaki Tanaka, Numazu (JP); Shinya Hirota, Susono (JP); Takamitsu Asanuma, Susono (JP); Koichi Kimura, Susono (JP); Koichiro Nakatani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/817,172

(22) Filed: Mar. 27, 2001

(65) Prior Publication Data

US 2001/0027645 A1 Oct. 11, 2001

(30) Foreign Application Priority Data

| Mar. 27, 2000 | (JP) | ................................. 2000-090755 |
| Mar. 28, 2000 | (JP) | ................................. 2000-093024 |
| Mar. 29, 2000 | (JP) | ................................. 2000-092532 |
| Nov. 10, 2000 | (JP) | ................................. 2000-343813 |

(51) Int. Cl.⁷ ................................................. F01N 3/00
(52) U.S. Cl. ............................. 60/296; 60/274; 60/288; 60/286; 60/297
(58) Field of Search ........................... 60/274, 285, 286, 60/288, 296, 297, 301, 287, 295; 422/169–172

(56) References Cited

U.S. PATENT DOCUMENTS

| 2,946,651 A | * | 7/1960 | Houdry .................... 60/296 |
| 5,100,632 A | | 3/1992 | Dettling et al. .......... 423/213.5 |
| 5,388,406 A | * | 2/1995 | Takeshima et al. ........... 60/297 |
| 5,715,677 A | | 2/1998 | Wallman et al. .............. 60/274 |
| 5,768,888 A | * | 6/1998 | Matros et al. ............... 60/296 |
| 6,167,696 B1 | * | 1/2001 | Maaseidvaag et al. ........ 60/285 |
| 6,314,722 B1 | * | 11/2001 | Matros et al. ............... 60/296 |
| 6,367,246 B1 | | 4/2002 | Hirota et al. ................ 60/295 |
| 6,408,620 B2 | * | 6/2002 | Boegner et al. .............. 60/295 |

FOREIGN PATENT DOCUMENTS

| JP | 60-135613 | * | 7/1985 |
| JP | 60-235620 | | 11/1985 |
| JP | 61-223215 | * | 10/1986 |
| JP | 05179928 | | 7/1993 |
| JP | 6-159037 A | | 6/1994 |
| JP | 6-272541 A | | 9/1994 |
| JP | 07189655 | | 7/1995 |
| JP | 7-106290 B2 | | 11/1995 |
| JP | 9-94434 A | | 4/1997 |
| JP | 11-300165 A | | 11/1999 |
| JP | 3012249 B2 | | 12/1999 |
| JP | 2000-18026 A | | 1/2000 |
| JP | 0 984 142 A1 | | 3/2000 |

* cited by examiner

Primary Examiner—Thomas Denion
Assistant Examiner—Tu M. Nguyen
(74) Attorney, Agent, or Firm—Oliff & Berridge, PLC

(57) ABSTRACT

An exhaust purifying method and apparatus of an internal combustion engine are provided with an exhaust switch valve for switching a flow of exhaust gas flowing into an exhaust filter. By switching the exhaust switch valve, the exhaust gas is fed from one side and the other side of the filter, thereby stirring the soot (particulates) in the exhaust gas deposited on the filter having a NOx absorbent and an active-oxygen discharging agent supported thereon. Thus, the soot in the exhaust gas is continuously burned. Moreover, the switching of the exhaust switch valve and the rich spike are inhibited from being conducted simultaneously. In the case where the rich spike is conducted in order to discharge and reduce NOx absorbed in the NOx absorbent, the exhaust gas containing a large amount of HC and CO can be prevented from being discharged into the atmosphere without being purified.

10 Claims, 17 Drawing Sheets

EXHAUST PURIFYING METHOD AND APPARATUS OF AN INTERNAL COMBUSTION ENGINE

INCORPORATION BY REFERENCE

The disclosure of Japanese Patent Application Nos. 2000-00434 filed on Mar. 29, 2000 and 2000-04433 filed on Nov. 10, 2000 including the specification, drawings and abstract are incorporated herein by reference in their entirety.

BACKGROUND OF THE INVENTION

1. Field of the Invention

The invention relates to an exhaust purifying method and apparatus of an internal combustion engine. More particularly, the invention relates to an exhaust purifying method and apparatus capable of switching an exhaust gas flow such that the exhaust gas flows through a filter of the purifying apparatus alternately from the exhaust upstream side and exhaust downstream side.

2. Description of Related Art

In diesel engines, a particulate filter is provided in an exhaust passage of the engine in order to remove particulates such as soot contained in the exhaust gas. The particulates in the exhaust gas are temporarily trapped on the particulate filter and then ignited and burned so as to restore the particulate filter. However, the particulates trapped on the particulate filter are not ignited at a high temperature of about 600° C. or more, although the exhaust gas temperature of the diesel engine is normally considerably lower than 600° C. Accordingly, it is difficult to ignite the particulates trapped on the particulate filter with the exhaust gas heat. In order to ignite the particulates trapped on the particulate filter with the exhaust gas heat, it is necessary to enable the particulates to be ignited at a low temperature.

It is known that a particulate filter having a catalyst supported thereon can reduce the ignition temperature of the particulates. A variety of particulate filters are known which have a catalyst supported thereon in order to reduce the ignition temperature of the particulates.

For example, Japanese Patent Publication No. HEI 7-106290 discloses a particulate filter having a mixture of a platinum group metal and an alkaline earth metal oxide supported thereon. In this particulate filter, particulates are ignited at a relatively low temperature of approximately 350° C. to 400° C., and then burned continuously.

In diesel engines, the exhaust gas temperature reaches 350° C. to 400° C. under a high load. Accordingly, in the aforementioned particulate filter, the particulates can seemingly be ignited and burned with the exhaust gas heat under a high load. Actually, however, the particulates are not always ignited even when the exhaust gas temperature reaches 350° C. to 400° C. Moreover, even if the particulates are ignited, only a part of the particulates is burned, and a large amount of particulates is left unburned.

In other words, if the exhaust gas contains a small amount of particulates, the amount of particulates that adhere to the particulate filter is small. In such a case, the particulates on the particulate filter are ignited when the exhaust gas temperature reaches 350° C. to 400° C., and then burned continuously.

However, if the exhaust gas contains a large amount of particulates, additional particulates are deposited on the particulates adhering to the particulate filter before the latter particulates have been burned completely. As a result, the particulates are deposited on the particulate filter in a laminated manner. In such a case, a part of the particulates that is likely to be in contact with oxygen is burned, but the remaining particulates that are less likely to be in contact with oxygen are not burned, and a large amount of particulates are left unburned. Therefore, when the exhaust gas contains a large amount of particulates, a large amount of particulates continues to be deposited on the particulate filter.

If a large amount of particulates is deposited on the particulate filter, these deposited particulates gradually become less likely to be ignited and burned. The reason for this is considered because, while the particulates are being deposited, carbon in the particulates changes to a substance that is less likely to be burned, such as graphite or the like. Actually, if a large amount of particulates is continuously deposited on the particulate filter, the deposited particulates are not ignited at a low temperature of 350° C. to 400° C. A high temperature of 600° C. or more is required in order to ignite the deposited particulates. In diesel engines, however, the exhaust gas temperature does not normally reach a high temperature of 600° C. or more. Accordingly, if a large amount of particulates is continuously deposited on the particulate filter, it becomes difficult to ignite the deposited particulates with the exhaust gas heat.

Moreover, when the deposited particles are burned, ashes, i.e., the matter left after the particulates have been burned, agglomerate into a large mass, resulting in clogging of the pores in the particulate filter. The number of clogged pores is gradually increased with time, so that pressure loss of the exhaust gas flow in the particulate filter is gradually increased As the pressure loss of the exhaust gas flow is increased, the engine output is reduced, which also necessitates early replacement of the particulate filter with a new one.

Thus, once a large amount of particulates has been deposited in a laminated manner, this causes various problems as described above. Therefore, it is necessary to prevent a large amount of particulates from being deposited in a laminated manner, in view of the balance between the amount of particulates contained in the exhaust gas and the amount of particulates that can be burned on the particulate filter.

The aforementioned problems cannot be avoided by such a continuous combustion process that a conventional exhaust purifying filter having a catalyst thereon is merely provided in an exhaust pipe and that exhaust purification relies on the operation state of the internal combustion engine.

Therefore, by enabling an exhaust gas flow to be switched such that the exhaust gas flows through a filter of a purifying apparatus alternately from the exhaust upstream side and downstream side in order to enable continuous combustion of the particulates as much as possible, the particulates are deposited on both sides of the filter, whereby the particulate deposition amount per unit area can be reduced. Moreover, switching of the exhaust gas flow enables the depositing particles to be stirred and scattered. Furthermore, if a NOx absorbent is provided for a filter base material, NOx in the exhaust gas can also be purified.

In the case where the NOx absorbent is provided for the filter base material in order to simultaneously purify NOx, exhaust gas at a rich air-fuel ratio must be intermittently fed to the filter (this is called "rich spike") so as to discharge NOx from the NOx absorbent for reduction. This is because of limited NOx-absorbing ability of the NOx absorbent. On the other hand, in order to switch the direction of the exhaust gas flowing through the filter as described above for the purpose of facilitating continuous combustion of the particulates, a switch valve must be provided within the exhaust pipe. However, the structure of the switch valve necessitates the exhaust gas to bypass the filter during switching of the exhaust gas flow.

Accordingly, in the case where the timing of conducting the rich spike matches the timing of switching the exhaust gas flow by the switch valve, the exhaust gas at a rich air-fuel ratio and containing a large amount of reducing agent may possibly be discharged without passing through the filter.

In the case of using the exhaust purifying filter having the NOx absorbent at the filter base material in order to simultaneously remove the particulates and purify NOx, a system for feeding the exhaust gas so as to bypass the filter is possible in order to prevent the particulates from being deposited on the filter in a preset amount or more when the particulate oxidation capability of the filter is not enough, or may possibly be degraded due to a low temperature of the exhaust gas (e.g., during decelerating operation).

Even in such a system, if the rich spike for purifying NOx is conducted while the exhaust gas is being fed so as to bypass the filter, the exhaust gas at a rich air-fuel ratio and containing a large amount of reducing agent is discharged without passing through the filter.

SUMMARY OF THE INVENTION

The invention is made in view of the above, and it is an object of the invention to prevent, in an exhaust purifying method and apparatus provided with a filter having a NOx absorbent, exhaust gas containing a large amount of reducing agent required to discharge NOx from the NOx absorbent from being discharged untreated.

It is another object of the invention to provide an exhaust purifying method and apparatus of an internal combustion engine capable of preventing, while unburned fuel is being supplied to a filter in order to improve the particulate oxidation removal capability of the filter, the unburned fuel from bypassing the filter and thus being discharged to the outside of the vehicle without being supplied to the filter.

It is a further object of the invention to provide an exhaust purifying method and apparatus of an internal combustion engine capable of preventing, while exhaust gas at a relatively small air-fuel ratio and containing HC, CO, unburned fuel and the like is flowing, the exhaust gas from being discharged into the atmosphere without passing through a particulate filter.

An exhaust purifying method and apparatus of an internal combustion engine in a first aspect of the invention includes: a filter having a NOx absorbent and an active-oxygen discharging agent supported thereon, and capable of temporarily trapping particulates contained in exhaust gas, the NOx absorbent absorbing NOx when the exhaust gas flowing therein has a lean air-fuel ratio and discharging the absorbed NOx when an oxygen concentration in the exhaust gas flowing therein is reduced, the active-oxygen discharging agent facilitating oxidation of the particulates; a valve having a switching operation capable of alternately switching between a first flow for feeding the exhaust gas from one side of the filter and a second flow for feeding the exhaust gas from the other side of the filer, the exhaust gas flowing so as to bypass the filter during the switching; a controller that inhibits simultaneous control of an air-fuel ratio operation of the exhaust gas flowing into the filter to a theoretical or rich air-fuel ratio so as to discharge NOx from the NOx absorbent supported on the filter, and the switching operation of the valve.

In the first aspect, the controller inhibits the air-fuel ratio operation and the switching operation of the valve from being conducted simultaneously. Therefore, the exhaust gas is controlled to the theoretical or rich air-fuel ratio in order to discharge NOx from the NOx absorbent is prevented from being discharged untreated without passing through the filter.

In the first aspect, the switching operation of the valve can be normally conducted in every decelerating operation, at predetermined time intervals, at every predetermined running distance or the like, and is not particularly limited. In the first aspect, the valve may be composed of a switch valve capable of switching a flow direction of the exhaust gas in the filter between forward and reverse directions.

A second aspect of the invention includes: a filter for temporarily trapping particulates contained in exhaust gas and removing the particulates by oxidation; a valve having a switching operation capable of alternately switching between a first flow for feeding the exhaust gas from one side of the filter and a second flow for feeding the exhaust gas from the other side of the filer, the exhaust gas flowing so as to bypass the filter during the switching; a controller that controls supplying unburned fuel to the filter while simultaneously inhibiting the switching operation of the valve from being conducted.

In the second aspect, the unburned fuel is supplied to the filter. As a result, the unburned filter is also oxidized on the filter, so that the filter temperature rises. By switching the exhaust gas flow at this time, oxidation heat is prevented from leaving the filter, so that the filter temperature further rises. Such rise in filter temperature improves the particulate oxidation removal capability of the filter. Accordingly, it is preferable to supply the unburned fuel to the filter at a predetermined timing. However, if the unburned fuel supply and the switching operation of the valve are conducted simultaneously, the unburned fuel bypasses the filter so as to be discharged to the outside of the vehicle. By providing the controller for inhibiting the unburned fuel supply and the switching operation of the valve from being conducted simultaneously, the unburned fuel being supplied to the filter can be prevented from bypassing the filter and thus being discharged to the outside of the vehicle without being supplied to the filter.

A third aspect of the invention includes: a filter having a NOx absorbent and an active-oxygen discharging agent supported thereon, and capable of temporarily trapping particulates contained in exhaust gas, the NOx absorbent absorbing NOx when the exhaust gas flowing therein has a lean air-fuel ratio and discharging the absorbed NOx when an oxygen concentration in the exhaust gas flowing therein is reduced, the active-oxygen discharging agent facilitating oxidation of the particulates; a controller that provides simultaneous control of an air-fuel ratio of the exhaust gas flowing into the filter to a theoretical or rich air-fuel ratio so as to discharge NOx from the NOx absorbent supported on the filter; a valve that normally feeds the exhaust gas to the filter, but feeding the exhaust gas so as to bypass the filter when particulate oxidation capability of the filter is lower than, or may become lower than, a predetermined level; and a bypass operation that inhibits, even if the particulate oxidation capability of the filter is lower than the predetermined level, the valve from feeding the exhaust gas so as to bypass the filter, when the controller conducts the air-fuel ratio so as to discharge NOx from the NOx absorbent supported on the filter.

In the third aspect, in principle, the valve feeds the exhaust gas so as to bypass the filter, if the particulate oxidation capability of the filter is lower than the predetermined level. Therefore, the particulates can be prevented from being deposited on the filter in a preset amount or more. However, in the case where NOx is to be discharged from the NOx absorbent, the bypass operation inhibits the exhaust gas from bypassing the filter and thus ensures that the exhaust gas flows into the filter, even if the particulate oxidation capability of the filter is lower than the predetermined level. Therefore, the exhaust gas is controlled to the theoretical or rich air-fuel ratio in order to discharge NOx from the NOx absorbent is prevented from being discharged untreated without passing through the filter.

The third aspect may have a function to normally feed the exhaust gas to the filter, but to feed the exhaust gas so as to bypass the filter when the particulate oxidation capability of the filter is lower than, or may become lower than, a predetermined level.

In the third aspect, "when the oxidation capability of the filter is lower than the predetermined level" may be, for example, during load-reducing operation of the engine (during vehicle decelerating operation in the case of an internal combustion engine for driving the vehicle).

A fourth aspect of the invention is an exhaust purifying method and apparatus of an internal combustion engine, wherein a particulate filter for trapping particulates contained in exhaust gas discharged from a combustion chamber is provided in an exhaust passage of the engine, so that the particulates contained in the exhaust gas are trapped when the exhaust gas passes through a wall of the particulate filter. The particulate filter is capable of oxidizing the particulates temporarily trapped thereon. The exhaust purifying method and apparatus is further provided with a valve that inverts a flow of the exhaust gas passing through the wall of the particulate filter. The valve has a bypass mode for causing the exhaust gas to bypass the particulate filter without flowing therein. While a first exhaust gas at a relatively small air-fuel ratio is flowing, the valve is inhibited from being rendered in the bypass mode. While a second exhaust gas at a relatively large air-fuel ratio is flowing, the valve is allowed to be rendered in the bypass mode.

In the fourth aspect, while the first exhaust gas at a relatively small air-fuel ratio is flowing, the valve that inverts the flow of the exhaust gas passing through the wall of the particulate filter is inhibited from being rendered in the bypass mode. In other words, while the first exhaust gas at a relatively small air-fuel ratio is flowing, the exhaust gas is inhibited from bypassing the particulate filter without flowing therein. Accordingly, while the exhaust gas at a relatively small air-fuel ratio and containing HC, CO, unburned fuel and the like is flowing, the exhaust gas can be prevented from bypassing the particulate filter and thus being discharged into the atmosphere without passing through the particulate filter.

In a fifth aspect of the invention, if the exhaust gas discharged from the combustion chamber is flowing during low-temperature combustion in which a temperature of fuel and its surrounding gas in the combustion chamber becomes lower than a soot producing temperature and the soot is hardly generated, the valve is inhibited from being rendered in the bypass mode. The low-temperature combustion is conducted when SOx poisoning is to be restored, when NOx is to be discharged, or during low and medium load operation of the engine. Therefore, in the case where the exhaust gas containing HC, CO, unburned fuel and the like that is discharged from the combustion chamber is flowing during the low-temperature combustion conducted when SOx poisoning is to be restored, when NOx is to be discharged, or during the low and medium load operation of the engine, the exhaust gas can be prevented from bypassing the particulate filter and thus being discharged into the atmosphere without passing thorough the particulate filter.

A sixth aspect of the invention is an exhaust purifying method and apparatus of an internal combustion engine, wherein a particulate filter for trapping particulates contained in the exhaust gas discharged from a combustion chamber is provided in an exhaust passage of the engine, so that the particulates contained in the exhaust gas are trapped when the exhaust gas passes through a wall of the particulate filter. The particulate filter is capable of oxidizing the particulates temporarily trapped thereon. A NOx absorbent for absorbing NOx in a lean range and discharging NOx in a stoichiometric or rich range is supported on the particulate filter. The exhaust purifying method and apparatus is further provided with a valve that inverts a flow of the exhaust gas passing through the wall of the particulate filter. The valve has a bypass mode for causing the exhaust gas to bypass the particulate filter without flowing therein. Normally, the valve is rendered in the bypass mode when particulate oxidation capability of the particulate filter is lower than a predetermined level. However, in the case where NOx is to be discharged from the NOx absorbent, the valve is inhibited from being rendered in the bypass mode, even if the particulate oxidation capability of the particulate filter is lower than the predetermined level.

In the sixth aspect, the valve is normally rendered in the bypass mode when the particulate oxidation capability of the particulate filter is lower than the predetermined level, e.g., during decelerating operation of the engine. However, in the case where NOx is to be discharged from the NOx absorbent, the valve is inhibited from being rendered in the bypass mode, even if the particulate oxidation capability of the particulate filter is lower than the predetermined level. Therefore, normally, when the particulate oxidation capability of the particulate filter is lower than the predetermined level, increase in deposition amount of the particulates on the particulate filter can be suppressed that results from the fact that the exhaust gas possibly containing particulates passes through the particulate filter. In addition, in the case where NOx is to be discharged from the NOx absorbent, the exhaust gas containing HC, CO, unburned fuel and the like in order to discharge NOx from the NOx absorbent can be prevented from bypassing the particulate filter and thus being directly discharged into the atmosphere.

The aspects of the invention are not limited to the exhaust purifying method and apparatuses of the internal combustion engine as described above. Other aspects of the invention include, for example, a vehicle provided with the exhaust purifying apparatus of the invention, and a method for purifying the exhaust gas discharged from the combustion chamber of the internal combustion engine.

BRIEF DESCRIPTION OF THE DRAWINGS

FIG. 16A is a diagram showing a gas temperature in a combustion chamber and the like.

FIG. 19 is a diagram showing a change in throttle valve opening and the like.

DETAILED DESCRIPTION OF PREFERRED EMBODIMENTS

First, an exhaust purifying method and apparatus of an internal combustion engine according to a first embodiment of the invention will be described with reference to FIGS. 1 to 11.

Figure 1:
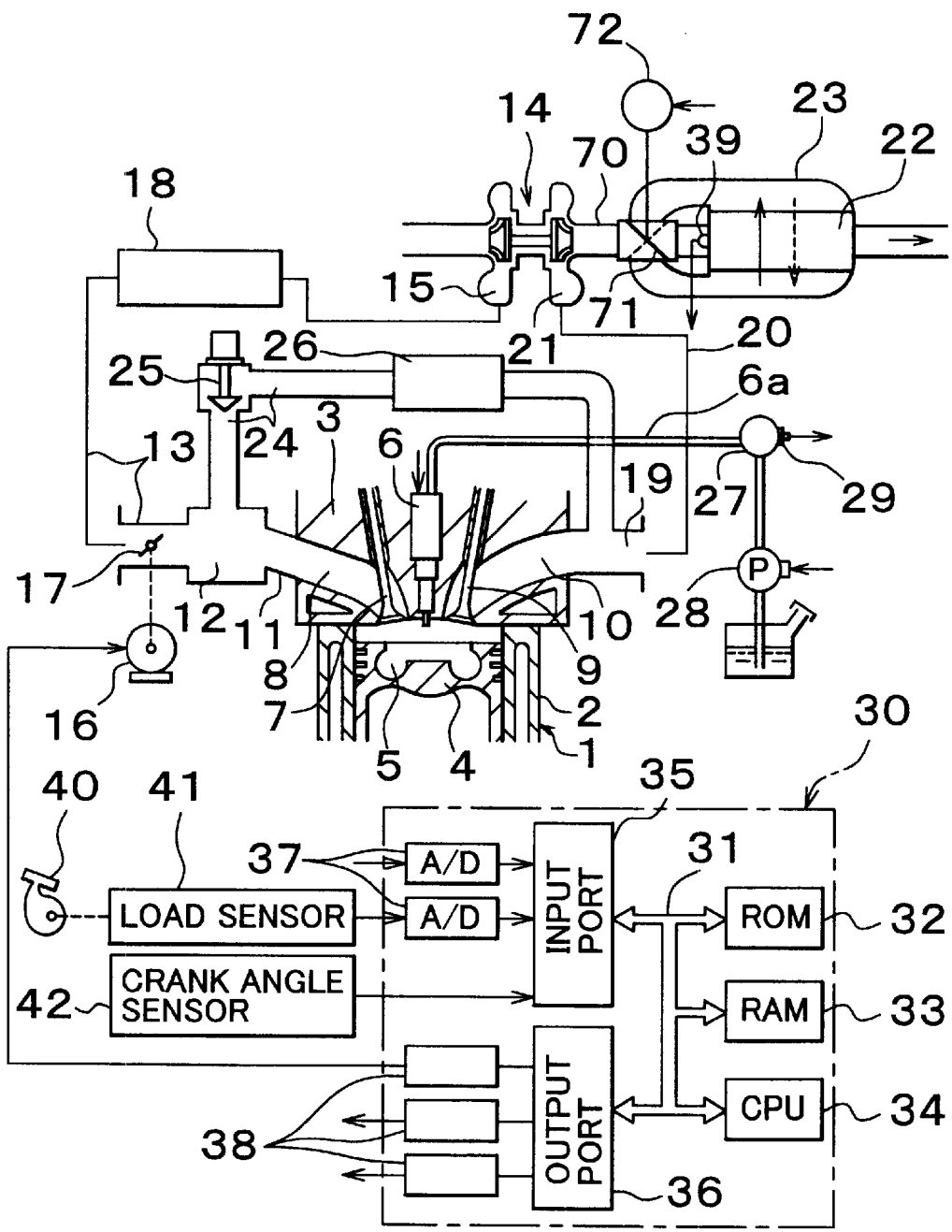
FIG. 1 is a general view of an internal combustion engine.

FIG. 1 shows the case where the invention is applied to a compression-ignition internal combustion engine for a vehicle. Note that the invention may also be applied to a spark-ignition internal combustion engine.

Referring to FIG. 1, the internal combustion engine is provided with an engine body 1, a cylinder block 2, a cylinder head 3, a piston 4, a combustion chamber 5, an electrically controlled fuel injection valve 6, an intake valve 7, an intake port 8, an exhaust valve 9, and an exhaust port 10. The intake port 8 is coupled to a surge tank 12 through a corresponding intake branch pipe 11. The surge tank 12 is coupled to a compressor 15 of an exhaust turbocharger 14 through an intake duct 13. A throttle valve 17 driven by a step motor 16 is provided within the intake duct 13. A cooling apparatus 18 for cooling the intake air flowing through the intake duct 13 is provided around the intake duct 13. In the embodiment shown in FIG. 1, engine cooling water is introduced into the cooling apparatus 18 so as to cool the intake air. On the other hand, the exhaust port 10 is coupled to an exhaust turbine 21 of the exhaust turbocharger 14 through an exhaust manifold 19 and an exhaust pipe 20. An outlet of the exhaust port 21 is coupled to an exhaust purifying apparatus having a casing 23 accommodating a particulate filter 22.

The exhaust manifold 19 and the surge tank 12 are coupled to each other through an exhaust gas recirculation (EGR) passage 24. An electrically controlled EGR control valve 25 is provided in the EGR passage 24. A cooling apparatus 26 for cooling EGR gas flowing through the EGR passage 24 is provided around the EGR passage 24. In the embodiment shown in FIG. 1, engine cooling water is introduced into the cooling apparatus 26 so as to cool the EGR gas. Each fuel injection valve 6 is coupled to a fuel reservoir, a so-called common rail 27, through a corresponding fuel supply pipe 6a. Fuel is supplied into the common rail 27 from an electrically controlled fuel pump 28 having a variable discharge amount. The fuel supplied into the common rail 27 is supplied to the fuel injection valves 6 through the respective fuel supply pipes 6a. A fuel pressure sensor 29 for detecting a fuel pressure within the common rail 27 is mounted to the common rail 27. The discharge amount of the fuel pump 28 is controlled such that the fuel pressure within the common rail 27 reaches a target fuel pressure, based on an output signal of the fuel pressure sensor 29.

An electronic control unit (ECU) 30 is composed of a digital computer, and includes a ROM (Read Only Memory) 32, a RAM (Random Access Memory) 33, a CPU (microprocessor) 34, an input port 35 and an output port 36, which are connected to each other through a bi-directional bus 31. The output signal of the fuel pressure sensor 29 is input to the input port 35 through a corresponding A/D converter 37. A temperature sensor 39 for detecting a temperature of the particulate filter 22 is mounted to the particulate filter 22. An output signal of the temperature sensor 39 is input to the input port 35 through a corresponding A/D converter 37. A load sensor 41 for generating an output voltage proportional to the stepping amount L of an accelerator pedal 40 is connected to the accelerator pedal 40, and an output voltage of the load sensor 41 is input to the input port 35 through a corresponding A/D converter 37. Moreover, a crank angle sensor 42 for generating an output pulse every time a crankshaft rotates by, e.g., 30° is connected to the input port 35. The output port 36 is connected through corresponding driving circuits 38 to the fuel injection valves 6, step motor 16 for driving the throttle valve, EGR control valve 25, fuel pump 28, and actuator 72 that will be described later.

In the illustrated embodiment, the controller (the ECU 30) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

Figure 2A:
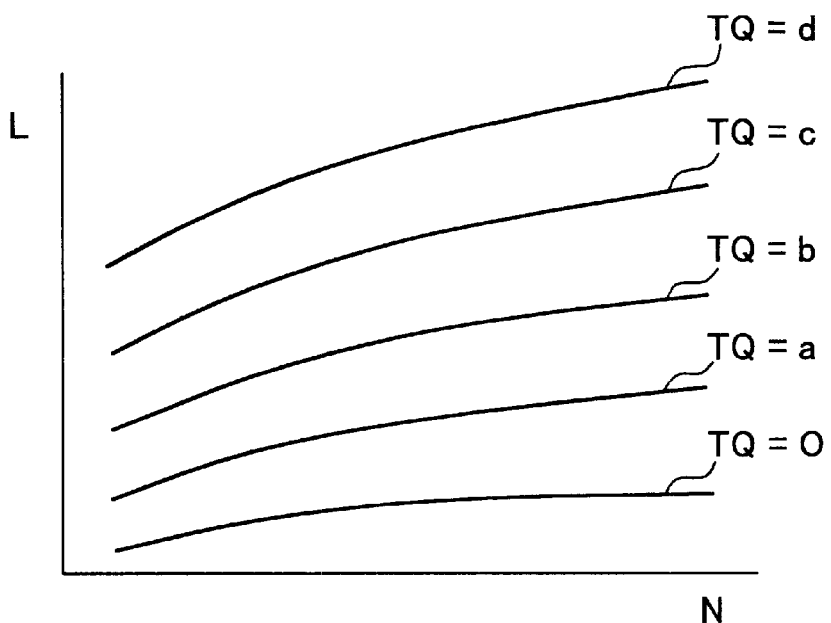
FIG. 2A is a diagram showing required torque of the engine.
Figure 2B:
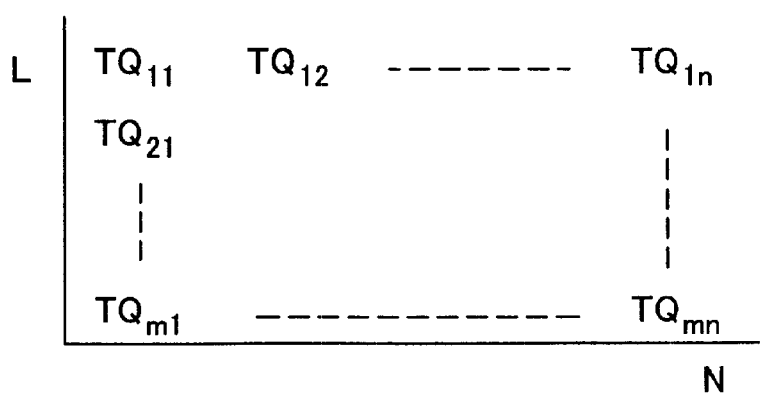
FIG. 2B is a map of the stepping amount L of the accelerator pedal and the engine speed N.

FIG. 2A shows the relation between required torque TQ, stepping amount L of the accelerator pedal 40 and engine speed N. Note that, in FIG. 2A, each curve represents an equal torque curve. The curve shown by TQ=0 indicates that the torque is zero. In the remaining curves, the required torque is sequentially increased in the order of TQ=a, TQ=b, TQ=c, and TQ=d. The required torque TQ shown in FIG. 2A is pre-stored in the ROM 32 as a function of the stepping amount L of the accelerator pedal 40 and the engine speed N in the form of a map as shown in FIG. 2B. In the embodiment of the invention, the required torque TQ according to the stepping amount L of the accelerator pedal 40 and the engine speed N is calculated from the map shown in FIG. 2B, and the fuel injection amount or the like is calculated based on the calculated required torque TQ.

Figure 3:
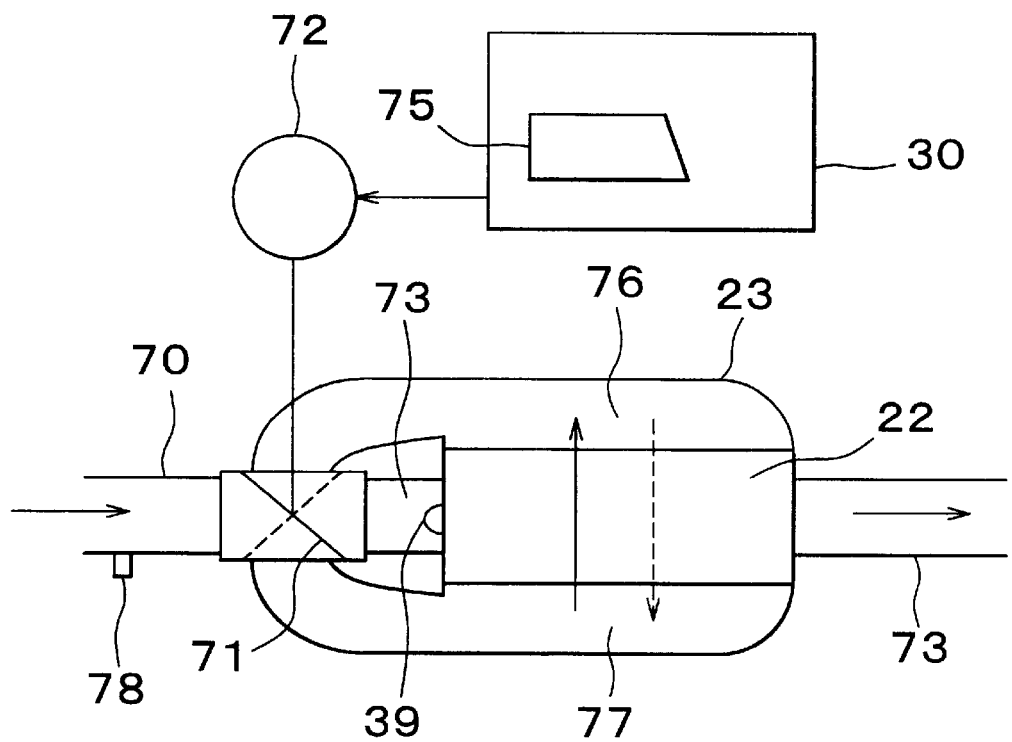
FIG. 3 is a top view of an exhaust purifying apparatus.
Figure 4:
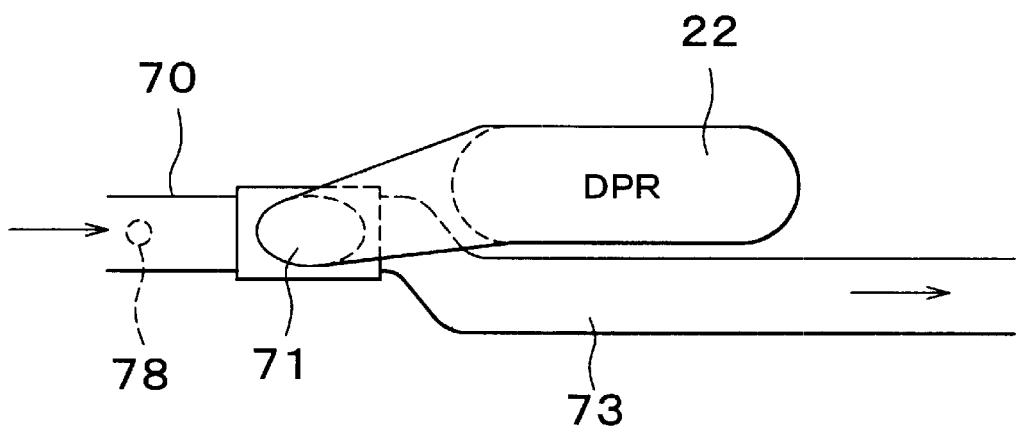
FIG. 4 is a front view of the exhaust purifying apparatus.

As shown in FIGS. 1, 3 and 4, in the exhaust purifying apparatus, an exhaust pipe 70 is connected to the outlet of the exhaust turbine 21. The exhaust pipe 70 branches into first and second exhaust passages 76 and 77 that respectively connect to one and the other of the surfaces of the particulate filter 22 accommodated in the casing 23. Moreover, the exhaust pipe 70 is provided with a bypass passage 73 that causes the exhaust gas to be directly discharged from the branch point of the first and second exhaust passages 76 and 77 without passing through the particulate filter 22.

An exhaust switch valve 71 is provided at the branch point of the first and second exhaust passages 76 and 77. The exhaust switch valve 71 is driven by the actuator 72 so as to alternately switch to a first flow (forward flow) and a second flow (reverse flow) by selecting the first exhaust passage 76 and the second exhaust passage 77, respectively. In the first flow, the exhaust gas is fed from one side of the filter 22. In the second flow, the exhaust gas is fed from the other side of the filter 22.

The casing 23 accommodating the filter 22 is located directly above the exhaust pipe 70 forming the bypass passage 73, and the first and second exhaust passages 76 and 77 branched from the exhaust pipe 70 are respectively connected to both sides of the casing 23. Provided that the direction in which the exhaust gas passes through the filter 22 within the casing 23 as shown by the solid and dashed arrows in FIG. 3 is the length direction of the filter 22, the filter 22 is longer in the width direction perpendicular to the length direction than in the length direction. Such a structure enables reduction in the space within the vehicle for mounting the exhaust purifying apparatus that is composed of the casing 23 accommodating the filter 22.

The actuator 72 is driven by control means 75 implemented on the CPU 34 of the electronic control unit 30, and is driven by a control signal from the output port 36. Moreover, the actuator 72 is driven by a negative pressure resulting from driving of the internal combustion engine. When no negative pressure is applied to the actuator 72, the valve body is controlled to a position for selecting the first exhaust passage 76 (forward flow position). When a first negative pressure is applied to the actuator 72, the valve body is controlled to a neutral position. When a second negative pressure that is higher than the first negative pressure is applied to the actuator 72, the valve body is controlled to a position for selecting the second exhaust passage 77 (reverse flow position).

When the valve body is located at the forward flow position shown by the dashed line in FIG. 3, the exhaust switch valve 71 connects the exhaust pipe 70 to the first exhaust passage 76 as well as connects the second exhaust passage 77 to the bypass passage 73. Therefore, the exhaust gas sequentially flows through the exhaust pipe 70, first exhaust passage 76, filter 22, second exhaust passage 77 and bypass passage 73 in this order so as to be discharged into the atmosphere.

When the valve body is located at the reverse flow position shown by the solid line in FIG. 3, the exhaust switch valve 71 connects the exhaust pipe 70 to the second exhaust passage 77 as well as connects the first exhaust passage 76 to the bypass passage 73. Therefore, the exhaust gas sequentially flows through the exhaust pipe 70, second exhaust passage 77, filter 22, first exhaust passage 76 and bypass passage 73 in this order so as to be discharged into the atmosphere.

When the valve body is located at the neutral position that is in parallel with the axis of the exhaust pipe 70 as shown by the chain line in FIG. 3, the exhaust switch valve 71 connects the exhaust pipe 70 directly to the bypass passage 73. Therefore, the exhaust gas flows from the exhaust pipe 70 into the bypass passage 73 without passing through the filter 22, and then is discharged to the atmosphere.

By switching the valve body so as to repeatedly produce the forward and reverse flows, particulates such as soot actively move within the base material of the filter 22. Therefore, oxidation of the particulates is facilitated, whereby the particulates can be removed efficiently.

Figure 5A:
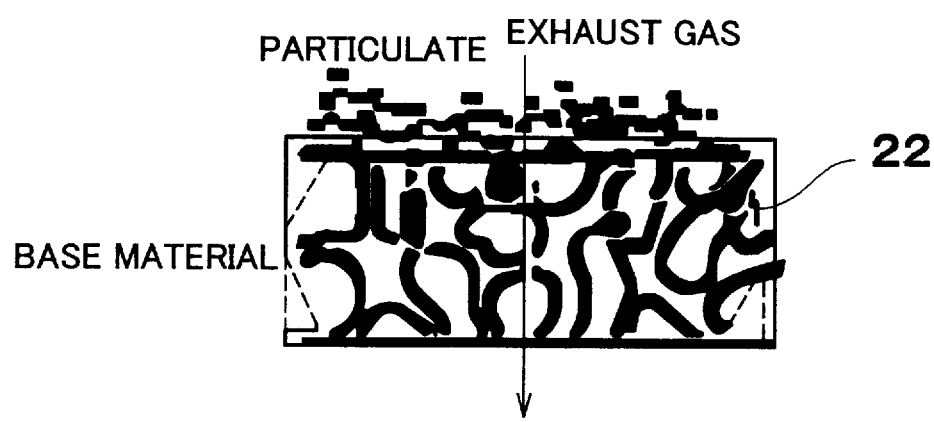
FIG. 5A is an illustrative view showing the state where particulates are deposited on a filter base material.

FIG. 5A is an explanatory view showing the case where the exhaust gas is fed to the filter 22 only from one direction. The particulates are accumulated only on one surface of the filter in an immovable manner. This not only causes increased pressure loss of the exhaust gas, but also prevents removal of the particulates.

Figure 5B:
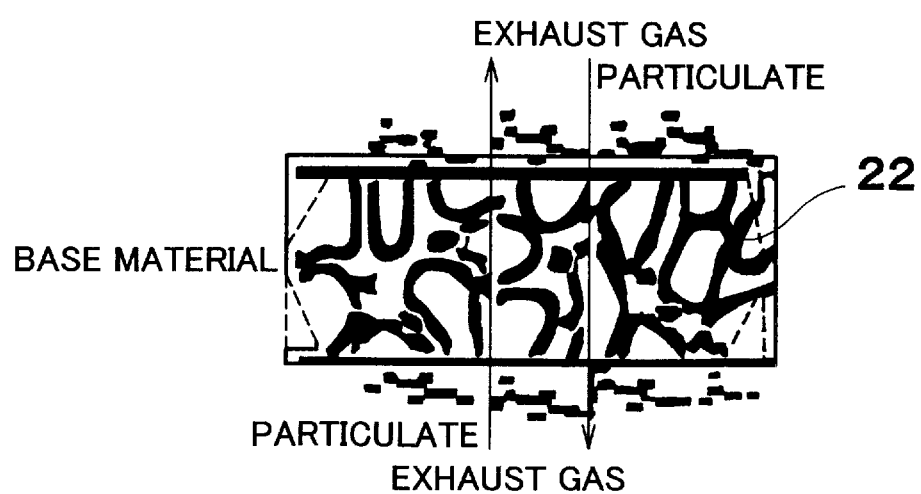
FIG. 5B is an illustrative view showing the state where the particulates are stirred by forward and reverse exhaust gas flows.

FIG. 5B is an explanatory view showing the case where the exhaust gas is fed to the filter 22 from both directions. The particulates are stirred at both surfaces of the filter. Therefore, the particulates actively move at both surfaces of the filter 22 or within the base material thereof. As a result, oxidation of the particulates can be facilitated by means of the active points in the entire filter base material, thereby enabling reduction in the accumulation amount of particulates on the filter 22. Accordingly, increase in pressure loss of the exhaust gas can be avoided.

Figure 6A:
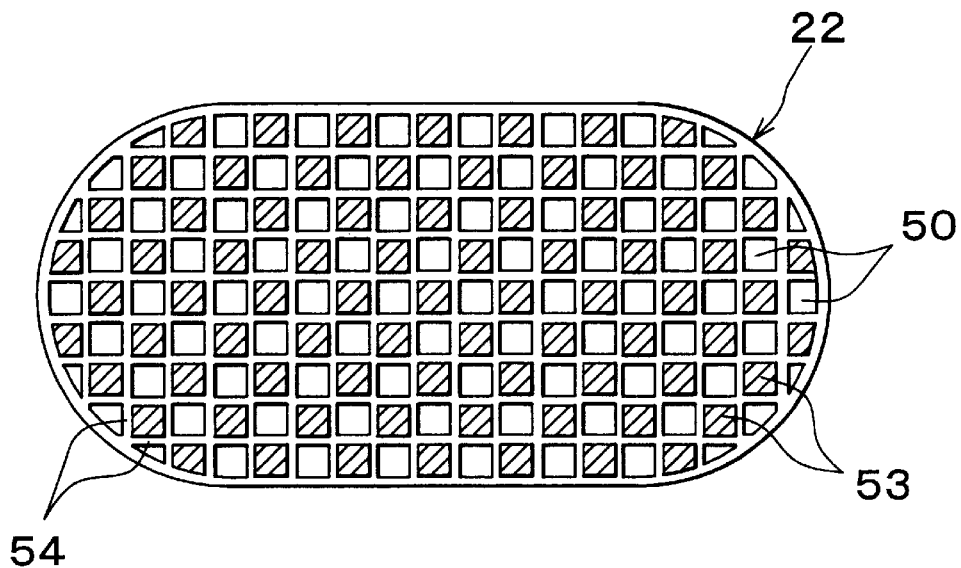
FIG. 6A is a diagram showing a particulate filter.
Figure 6B:
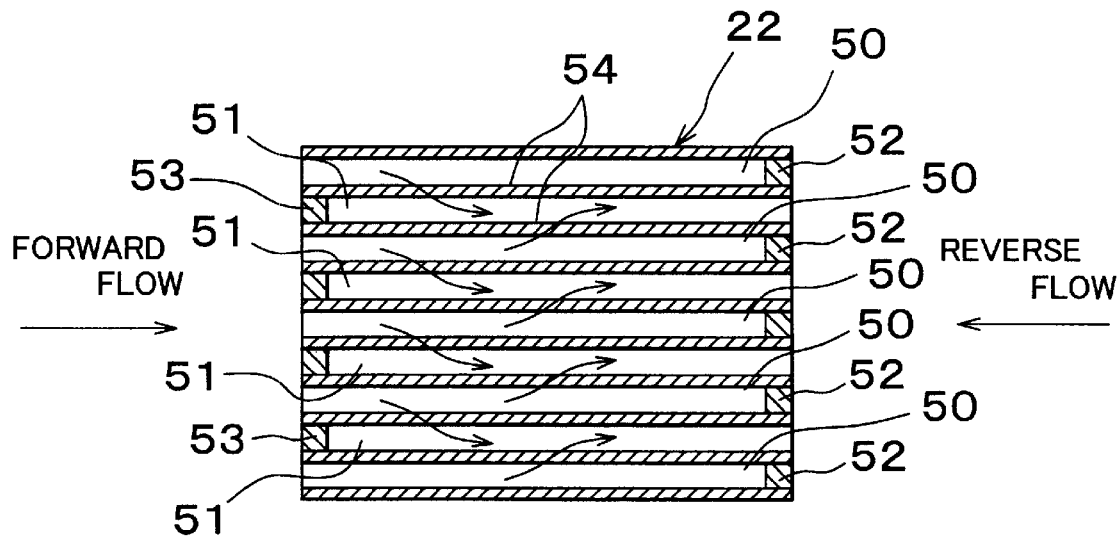
FIG. 6B is a cross sectional side view of the particulate filter.

FIGS. 6A and 6B show the structure of the particulate filter 22. Note that FIG. 6A is a front view of the particulate filter 22, and FIG. 6B is a side cross section thereof. As shown in FIGS. 6A and 6B, the particulate filter 22 has a honeycomb structure, and is of a wall-flow type having a plurality of exhaust flow passages 50, 51 extending in parallel with each other. These exhaust flow passages are composed of exhaust gas inlet passages 50 each having its downstream end closed by a stopper 52, and exhaust gas outlet passages 51 each having its upstream ends closed by a stopper 53. Note that the hatched portions in FIG. 6A indicate the stoppers 53. Accordingly, the exhaust gas inlet passages 50 and the exhaust gas outlet passages 51 are alternately arranged with a corresponding thin partition wall 54 therebetween. In other words, the exhaust gas inlet passages 50 and the exhaust gas outlet passages 51 are arranged such that each exhaust gas inlet passage 50 is surrounded by four exhaust gas outlet passages 51 and each exhaust gas outlet passage 51 is surrounded by four exhaust gas inlet passages 50.

The particulate filter 22 is formed from a porous material like cordierite. Therefore, the exhaust gas flowing into each exhaust gas inlet passage 50 flows out into adjacent exhaust gas outlet passages 51 through corresponding surrounding partition walls 54 as shown by the arrows in FIG. 6B.

In the embodiment of the invention, a support layer of, e.g., alumina is formed on the respective peripheral wall surfaces of the exhaust gas inlet passages 50 and the exhaust gas outlet passages 51, i.e., on both surfaces of each partition wall 54, and on the internal wall surfaces of the pores in each partition wall 54. A noble metal catalyst, an active-oxygen discharging agent and a NOx absorbent are supported on this support. The active-oxygen discharging agent takes in and retains oxygen therein if excess oxygen is present in the ambient environment, and discharges the retained oxygen in the form of active oxygen if the ambient oxygen concentration is reduced. The NOx absorbent absorbs NOx if the exhaust gas flowing therein has a lean air-fuel ratio, and discharges the absorbed NOx if the oxygen concentration in the exhaust gas flowing therein is reduced.

The air-fuel ratio of the exhaust gas flowing into the NOx absorbent refers to a ratio of air to fuel (hydrocarbon) supplied into the engine intake passage, combustion chamber 5, and exhaust passage upstream of the NOx absorbent. Note that, if the fuel (hydrocarbon) or air is not supplied into the exhaust passage upstream of the NOx absorbent, the air-fuel ratio of the exhaust gas flowing therein corresponds to the air-fuel ratio of the mixture supplied into the combustion chamber.

Platinum Pt can be used as the noble metal catalyst.

The active-oxygen discharging agent can be formed from at least one element selected from alkali metals such as potassium K, sodium Na, lithium Li, cesium Cs and rubidium Rb, alkaline earth metals such as barium Ba, calcium Ca and strontium Sr, rare earth elements such as lanthanum La and yttrium Y, and transition metals.

Note that, in this case, an alkali metal or alkaline earth metal having a higher ionization tendency than calcium Ca, i.e., potassium K, lithium Li, cesium Cs, rubidium Rb, barium Ba and strontium Sr, is preferably used as the active-oxygen discharging agent.

The NOx absorbent can be formed from at least one element selected from alkali metals such as potassium K, sodium Na, lithium Li, cesium Cs and rubidium Rb, alkaline earth metals such as barium Ba, calcium Ca and strontium Sr, and rare earth elements such as lanthanum La and yttrium Y.

Note that, in this case, an alkali metal or alkaline earth metal having a higher ionization tendency than calcium Ca, i.e., potassium K, lithium Li, cesium Cs, rubidium Rb, barium Ba and strontium Sr, is preferably used as the NOx absorbent.

As can be seen from comparison between the respective metals forming the active-oxygen discharging agent and the NOx absorbent, the metals forming these agents are mostly identical.

Accordingly, either different metals or the same metal(s) may be used as the active-oxygen discharging agent and the NOx absorbent. If the same metal(s) is used as the active-oxygen discharging agent and the NOx absorbent, this metal(s) simultaneously functions both as the active-oxygen discharging agent and the NOx absorbent. Hereinafter, an agent simultaneously functioning both as the active-oxygen discharging agent and the NOx absorbent is referred to as "active-oxygen discharge/NOx absorption agent".

In the present embodiment, description is exemplarily given for the case where platinum Pt as noble metal catalyst and potassium K as active-oxygen discharge/NOx absorption agent are supported on the support such as alumina.

As described above, potassium K as active-oxygen discharge/NOx absorption agent simultaneously functions both as the active-oxygen discharging agent and the NOx absorbent. This exhaust purifying apparatus utilizes the function as the active-oxygen discharging agent in order to facilitate removal of the particulates within the exhaust gas by oxidation, and utilizes the function as the NOx absorbent in order to purify NOx within the exhaust gas. Hereinafter, a purifying mechanism of this exhaust purifying apparatus will be described in view of the respective functions.

First, particulate removal with the particulate filter 22 utilizing the function as the active-oxygen discharging agent of the active-oxygen discharge/NOx absorption agent will be described. Note that, even if another alkali metal, alkaline earth metal, rare earth element and/or transition metal are used as the active-oxygen discharging agent, the function as the active-oxide discharging agent is the same, so that the particulate removal is conducted with the same mechanism.

In the compression-ignition internal combustion engine as shown in FIG. 1, combustion proceeds under excess air. Accordingly, the exhaust gas contains a large amount of excess air. In other words, in the compression-ignition internal combustion engine as shown in FIG. 1, the exhaust gas has a lean air-fuel ratio. Moreover, NO is generated within the combustion chamber 5, so that the exhaust gas contains NO. The fuel contains sulfur S, which reacts with oxygen within the combustion chamber 5 into $SO_2$. Accordingly, the exhaust gas contains $SO_2$. Thus, the exhaust gas containing excess air, NO and $SO_2$ flows into the exhaust gas inlet passages 50 of the particulate filter 22.

Figure 7A:
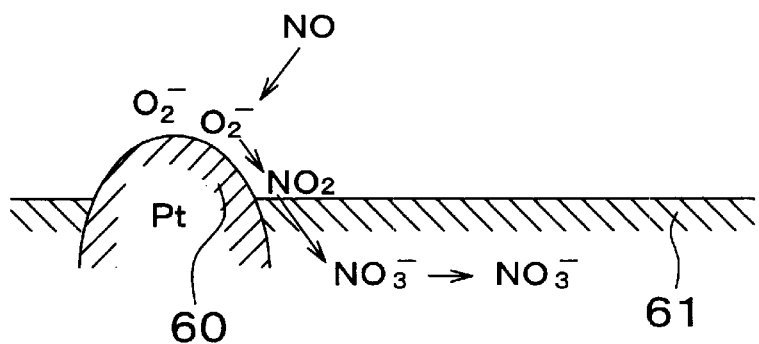
FIG. 7A is a diagram showing particulate oxidation.
Figure 7B:
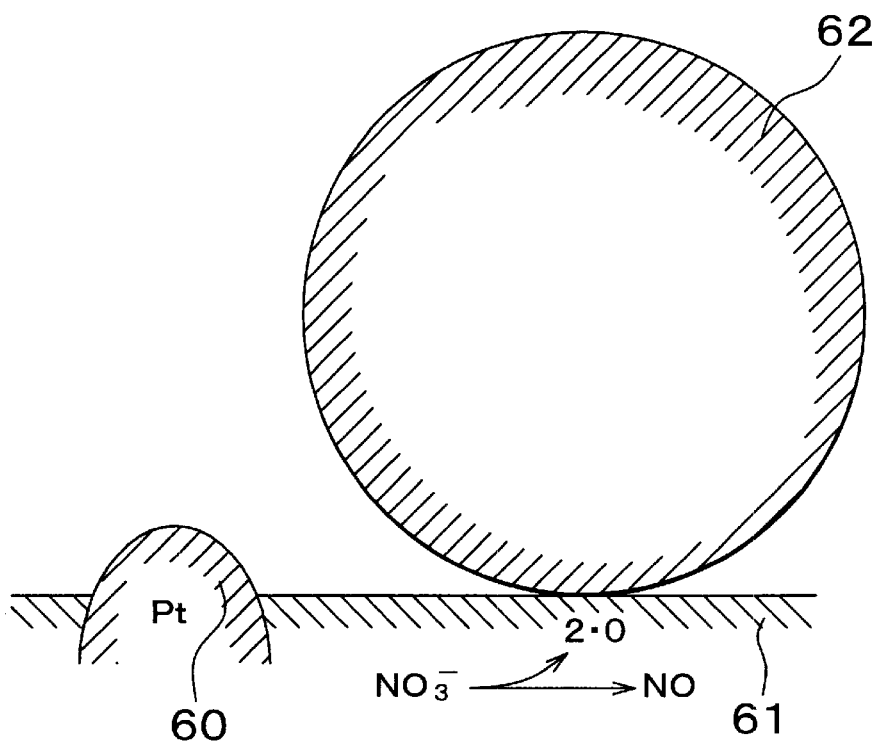
FIG. 7B is a diagram showing particulate oxidation.

FIGS. 7A and 7B are enlarged view schematically showing the surface of the support layer formed on the inner peripheral surface of each exhaust gas inlet passage 50 and on the inner wall surface of the pores in each partition wall 54. Note that FIGS. 7A and 7B show a particle 60 of platinum Pt and an active-oxygen discharge/NOx absorption agent 61 including potassium K.

As described above, the exhaust gas contains a large amount of excess oxygen. Therefore, when the exhaust gas flows into the exhaust gas inlet passage 50 of the particulate filter 22, oxygen $O_2$ adheres to the surface of platinum Pt in the form $O_2^-$ or $O^{2-}$, as shown in FIG. 7A. Moreover, NO in the exhaust gas reacts with $_2^-$ or $O^{2-}$ at the surface of platinum Pt into $NO_2(2NO+O_2\rightarrow 2NO_2)$. A part of $NO_2$ thus produced is then absorbed in the active-oxygen discharge/NOx absorption agent 61 while being oxidized on platinum Pt, and diffuses into the active-oxygen discharge/NOx absorption agent 61 in the form of nitrate ions $NO_3^-$ as shown in FIG. 7A while bonding to potassium K, so that a part of nitrate ions $NO_3^-$ produces potassium nitrate $KNO_3$.

As described above, the exhaust gas also contains $SO_2$, which is absorbed in the active-oxygen discharge/NOx absorption agent 61 with the same mechanism as that of NO.

More specifically, as described above, oxygen $O_2$ adheres to the surface of platinum Pt in the form of $O_2^-$ or $O^{2-}$, so that $SO_2$ in the exhaust gas reacts with $O_2^-$ or $O^{2-}$ at the surface of platinum Pt into $SO_3$.

A part of $SO_3$ thus produced is then absorbed in the active-oxygen discharge/NOx absorption agent 61 while being further oxidized on platinum Pt, and diffuses into the active-oxygen discharge/NOx absorption agent 61 in the form of sulfate ions $SO_4^{2-}$ while bonding to potassium K, so that potassium sulfate $K_2SO_4$ is produced. Thus, potassium nitrate $KNO_3$ and potassium sulfate $K_2SO_4$ are produced within the active-oxygen discharge/NOx absorption agent 61.

Moreover, particulates mainly formed from carbon C. are produced in the combustion chamber 5. Therefore, the exhaust gas contains these particulates. While the exhaust gas is flowing through the exhaust gas inlet passage 50 of the particulate filter 22 or flowing from the exhaust gas inlet passage 50 into the exhaust gas outlet passage 51, these particulates contained in the exhaust gas are brought into contact with the surface of the support layer, e.g., the surface of the active-oxygen discharge/NOx absorption agent 61, and adhere thereto, as shown by reference numeral 62 in FIG. 7B.

Thus, when the particulates 62 adhere to the surface of the active-oxygen discharge/NOx absorption agent 61, the oxygen concentration is reduced at the contact surface between the particulates 62 and the active-oxygen discharge/NOx absorption agent 61. Such a reduced oxygen concentration results in a concentration difference between the contact surface and the inside of the active-oxygen discharge/NOx absorption agent 61 having a high oxygen concentration. Therefore, oxygen within the active-oxygen discharge/NOx absorption agent 61 tries to move toward the contact surface between the particulates 62 and the active-oxygen discharge/NOx absorption agent 61. As a result, potassium nitrate $KNO_3$ produced within the active-oxygen discharge/NOx absorption agent 61 is decomposed into potassium K, oxygen O and NO, so that oxygen O moves toward the contact surface between the particulates 62 and the active-oxygen discharge/NOx absorption agent 61, whereas NO is discharged to the outside from the active-oxygen discharge/NOx absorption agent 61. Then, NO thus discharged to the outside is oxidized on platinum Pt located downstream so as to be absorbed again in the active-oxygen discharge/NOx absorption agent 61.

At this time, potassium sulfate $K_2SO_4$ produced within the active-oxygen discharge/NOx absorption agent 61 is also decomposed into potassium K, oxygen O and $SO_2$, so that oxygen O moves toward the contact surface between the particulates 62 and the active-oxygen discharge/NOx absorption agent 61, whereas $SO_2$ is discharged to the outside from the active-oxygen discharge/NOx absorption agent 61. Then, $SO_2$ thus discharged to the outside is oxidized on platinum Pt located downstream so as to be absorbed again in the active-oxygen discharge/NOx absorption agent 61.

Oxygen O moving toward the contact surface between the particulates 62 and the active-oxygen discharge/NOx absorption agent 61 results from decomposition of a compound such as potassium nitrate $KNO_3$ or potassium sulfate $K_2SO_4$. Oxygen O resulting from decomposition of the compound has high energy, and is extremely active. Accordingly, the oxygen moving toward the contact surface between the particulates 62 and the active-oxygen discharge/NOx absorption agent 61 is active oxygen O. When such active oxygen O is brought into contact with the particulates 62, the particulates 62 are oxidized in a short time without luminous flame. As a result, most particulates disappear. Accordingly, it is quite unlikely that particulates 62 will be deposited on the particulate filter 22. The time required for the particulates to be removed through oxidation on the particulate filter ranges from a few minutes to dozens of minutes.

It is considered that $NO_x$ are diffused in the active-oxygen discharge agent 61 in the form of nitrate ion $NO_3^-$ while repeatedly connecting to and separating from oxygen atoms. Active oxygen is generated also during this period. The particulates 62 are oxidized also by this active oxygen. Further, the particulates 62 that have thus adhered onto the particulate filter 22 are oxidized by active oxygen O but are oxidized also by oxygen in exhaust gas.

In the case of the particulates deposited on the particulate filter 22 in a laminated manner as in the conventional examples, the particulates bum with flame at the glowing particulate filter 22. Such combustion with flame can be maintained only at a high temperature. Therefore, in order to maintain the combustion with flame, the particulate filter 22 must be kept at a high temperature.

In contrast, according to the invention, the particulates 62 are oxidized without luminous flame as described above, and the surface of the particulate filter 22 does not glow. In other words, according to the invention, the particulates 62 are removed by oxidation at a significantly lower temperature than that of the conventional examples. Accordingly, the particulate removal by oxidation of the particulates 62 without luminous flame according to the invention is completely different from the conventional particulate removal by combustion with flame.

Moreover, the particulate removal by oxidation is conducted at a considerably low temperature. Accordingly, the temperature of the particulate filter 22 does not rise significantly, so that the particulate filter 22 is hardly degraded. Moreover, since it is quite unlikely that particulate is deposited on the particulate filter 22, ashes, the matter left after the particulates have been burned, are less likely to agglomerate, so that the particulate filter 22 is less susceptible to clogging.

Such clogging is mainly caused by calcium sulfate $CaSO_4$. More specifically, fuel and lubricating oil contain calcium Ca. Therefore, calcium Ca is contained in the exhaust gas. Calcium Ca produces calcium sulfate $CaSO_4$ in the presence of $SO_3$. Calcium sulfate $CaSO_4$ is solid and is not thermally decomposed even at a high temperature. Accordingly, calcium sulfate $CaSO_4$ thus produced fills the pores of the particulate filter 22, resulting in the clogging.

However, in the case where an alkali metal or alkaline earth metal having a higher ionization tendency than calcium Ca, e.g., potassium K, is used as the active-oxygen discharge/NOx absorption agent 61, $SO_3$ diffusing into the active-oxygen discharge/NOx absorption agent 61 bonds to potassium K into potassium sulfate $K_2SO_4$. Thus, calcium Ca passes through the partition walls 54 of the particulate filter 22 into the exhaust gas outlet passages 51 without bonding to $SO_3$. Accordingly, the pores of the particulate filter 22 are not susceptible to clogging. As a result, it is preferable that an alkali metal or alkaline earth metal having a higher ionization tendency than calcium Ca, i.e., potassium K, lithium Li, cesium Cs and barium Ba, is used as the active-oxygen discharge/NOx absorption agent 61, as described above.

Platinum Pt and active-oxygen discharge/NOx absorption agent 61 are more likely to be activated as the temperature of the particulate filter 22 rises. Therefore, the amount of active oxygen O that can be discharged from the active-oxygen discharge/NOx absorption agent 61 per unit time is increased as the temperature of the particulate filter 22 rises. As a matter of course, particulates 62 are more likely to be removed by oxidation as the temperature of the particulates 62 themselves rises. Accordingly, the amount of particulates that can be removed per unit time by oxidation on the particulate filter 22 without luminous flame is increased as the temperature of the particulate filter 22 rises.

Figure 9:
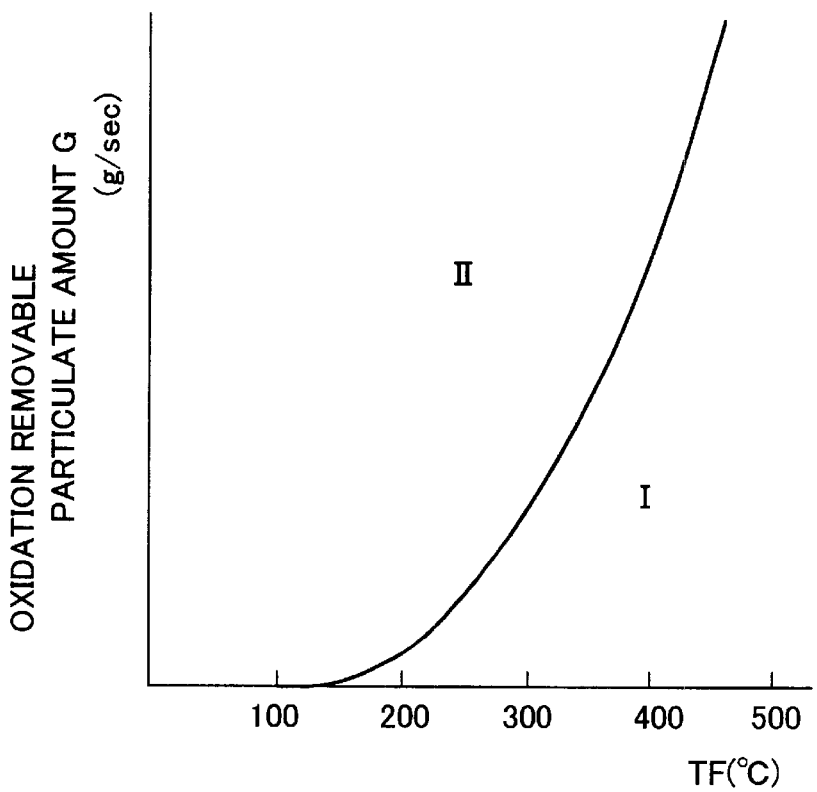
FIG. 9 is a diagram showing the relation between an oxidation removable particulate amount and a temperature of the particulate filter.

The solid line in FIG. 9 shows the amount of particulates G that can be removed per unit time by oxidation without luminous flame (hereinafter, such an amount of particulates is simply referred to as oxidation-removable particulate amount G). Note that, in FIG. 9, the abscissa indicates a temperature TF of the particulate filter 22. Although FIG. 9 shows the amount of particulates G that can be removed by oxidation in the case where the unit time is one second, i.e., per one second, the unit time can be an arbitrary length of time such as one minute, ten minutes, etc. For instance, in the case where the unit time is ten minutes, the amount of particulates G that can be removed per unit time by oxidation represents the amount of particulates G that can be removed per ten minutes by oxidation. In this case, the amount of particulates G that can be removed per unit time by oxidation on the particulate filter 22 without luminous flame is likewise increased as the temperature of the particulate filter 22 rises, as shown in FIG. 9.

The amount of particulates discharged from the combustion chamber 5 per unit time is herein referred to as discharged particulate amount M. In the case where the discharged particulate amount M is smaller than the oxidation-removable particulate amount G, i.e., in region I of FIG. 9, most particulates discharged from the combustion chamber 5 are removed by oxidation on the particulate filter 22 without luminous flame within a short time after they are brought into contact with the particulate filter 22. The time required for the particulates to be removed through oxidation on the particulate filter ranges from a few minutes to dozens of minutes.

Figure 8A:
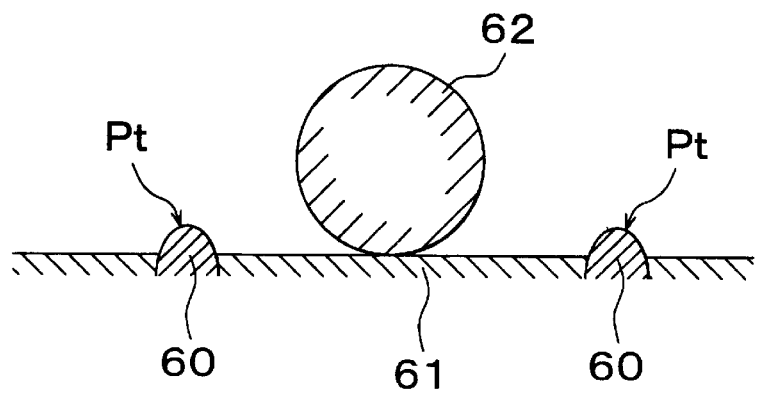
FIG. 8A is a diagram showing particulate deposition.
Figure 8B:
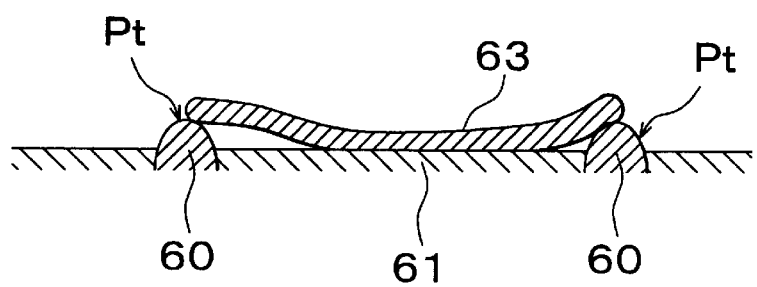
FIG. 8B is a diagram showing a remaining particulate portion.
Figure 8C:
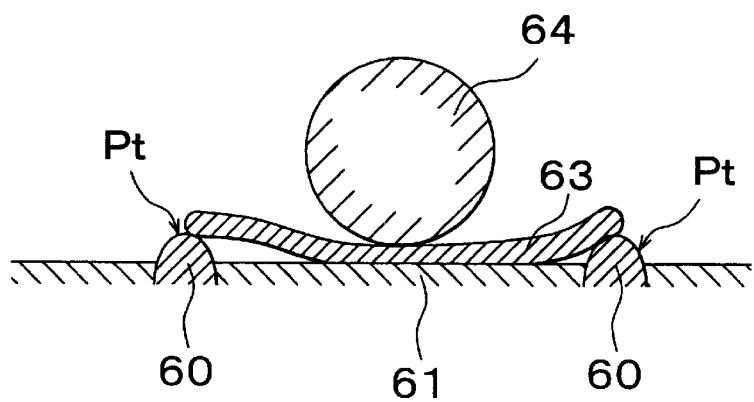
FIG. 8C is a diagram showing another particulate deposited on the remaining particulate portion.

On the other hand, in the case where the discharged particulate amount M is larger than the oxidation-removable particulate amount G, i.e., in region II of FIG. 9, the amount of active oxygen is not enough to oxidize all the particulates. FIGS. 8A, 8B and 8C show the manner in which the particulate is oxidized in such a case.

In the case where the amount of active oxygen is not enough to oxidize all the particulates, the particulates 62 are only partially oxidized when adhering to the active-oxygen discharge/NOx absorption agent 61, so that the particulate portion that was not fully oxidized is left on the support layer. If such an insufficient active-oxygen condition continues, the particulate portion that was not oxidized is successively left on the support layer, so that the surface of the support layer is covered with the remaining particulate portion 63, as shown in FIG. 8B.

The remaining particulate portion 63 covering the surface of the support layer gradually changes to carbon matter that is less susceptible to oxidation. Accordingly, the remaining particulate portion 63 is more likely to remain on the support layer. When the surface of the support layer is covered with the remaining particulate portion 63, oxidation of NO and $SO_2$ by platinum Pt as well as discharge of active oxygen from the active-oxygen discharge/NOx absorption agent 61 are suppressed. As a result, other particulates like particulate 64 are deposited on the remaining particulate portion 63 one after another as shown in FIG. 8C. In other words, the particulates are deposited in a laminated manner. Such laminated deposition separates the particulates from platinum Pt and active-oxygen discharge/NOx absorption agent 61. Therefore, even the particulates that are susceptible to oxidation are no longer oxidized by active oxygen O, so that other particulates are further deposited on the particulate 64 one after another. In other words, if such a condition that the discharged particulate amount M is smaller than the oxidation-removable particulate amount G continues, the particulates are deposited on the particulate filter 22 in a laminated manner.

Thus, in region I of FIG. 9, the particulates are oxidized on the particulate filter 22 in a short time without luminous flame, and in region II of FIG. 9, the particulates are deposited on the particulate filter 22 in a laminated manner. Accordingly, in order to prevent such laminated deposition of the particulates on the particulate filter 22, it is desirable that the relation between the discharged particulate amount M and the oxidation-removable particulate amount G is always included in region I. If the discharged particulate amount M is thus maintained smaller than the amount of particulates G that can be removed by oxidation, no particulate is deposited on the particulate filter 22 in a laminated manner. As a result, the pressure loss of exhaust gas flow in the particulate filter 22 scarcely changes and is maintained at a substantially constant minimum pressure loss value. Thus, the decrease in engine output can be maintained at its minimum value.

In practice, however, it is almost impossible to make the discharged amount M smaller than the oxidation-removable particulate amount G in every operation state. For example, at the start of the engine, the particulate filter 22 normally has a low temperature, so that the discharged particulate amount M normally becomes larger than the oxidation-removable particulate amount G. If the discharged particulate amount M becomes larger than the oxidation-removable particulate amount G like it does immediately after the start of the engine, the particulate portion that was not oxidized starts being left on the particulate filter 22. If the discharged particulate amount M is thus maintained smaller than the amount of particulates G that can be removed by oxidation, no particulate is deposited on the particulate filter 22 in a laminated manner. As a result, the pressure loss of exhaust gas flow in the particulate filter 22 scarcely changes and is maintained at a substantially constant minimum pressure loss value. Thus, the decrease in engine output can be maintained at its minimum value.

Thus, depending on the operation condition, the discharged particulate amount M may become larger than the oxidation-removable particulate amount G, so that the particulates may be deposited on the particulate filter 22 in a laminated manner.

In order to remove such deposited particulates by oxidation, the switch valve 71 provided in the exhaust pipe 70 is switched. By switching the switch valve 71, the direction in which the exhaust flows into the particulate filter 22 is switched, so that the exhaust upstream side and exhaust downstream side of the particulate filter 22 are inverted. As a result, in the portion serving as the exhaust downstream side of the particulate filter 22 before switching of the switch valve 71, the particulates adhere to the surface of the active-oxygen discharge/NOx absorption agent 61, so that active oxygen O is discharged. As a result, the particulates are removed by oxidation.

A part of discharged active oxygen O moves together with the exhaust gas to the exhaust downstream side of the particulate filter 22 so as to remove the particulates deposited thereon by oxidation. As described above, the particulates are herein stirred in the forward and reverse flow directions at both surfaces of the particulate filter 22. As a result, the particulates move actively at both surfaces of the particulate filter 22 or within the base material, and encounter the active points in the entire filter base material for oxidation.

Thus, the exhaust upstream and downstream sides of the particulate filter 22 are inverted as the non-oxidized particulates have started being deposited on the particulate filter 22. As a result, most particulates can be removed from the particulate filter 22 by oxidation.

If the particulates have been deposited on the particulate filter 22, the air-fuel ratio of a part or all of the exhaust gas is temporarily shifted to a rich value, whereby the deposited particulates can be oxidized without luminous flame. When the air-fuel ratio of the exhaust gas is shifted to a rich value, i.e., when the oxygen concentration in the exhaust gas is reduced, active oxygen O is rapidly discharged to the outside from the active-oxygen discharge/NOx absorption agent 61. If the air-fuel ratio of exhaust gas is made rich, the oxygen that has adhered to a nobel metal catalyst is removed by a reducing agent. This enhances the activity of the noble metal and makes it easy to discharge active oxygen. If the air-fuel ratio of exhaust gas is alternately made rich and lean, the amount of the active oxygen discharged form the oxygen occluding/active oxygen discharging agent 61 to the outside increases. The particulates bound to one another like a chain are decomposed by the active oxygen O discharged to the outside, so that the particulates become likely to be oxidized. Therefore, the total amount of the particulates that can be removed per unit time by the oxygen occluding/active oxygen discharged agent 61 increases, and the stacked particulates can be removed through combustion without generating luminous flames.

This is the particle purifying mechanism utilizing the function as the active-oxygen discharging agent of the active-oxygen discharge/NOx absorption agent.

Hereinafter, NOx purification utilizing the function as the NOx absorbent of the active-oxygen discharge/NOx absorption agent will be described. Note that, even if another alkali metal, alkaline earth metal and/or rare earth element are used as the NOx absorbent, the function as the NOx absorbent is the same, so that the NOx purification is conducted with the same mechanism.

Figures 10A, 10B:
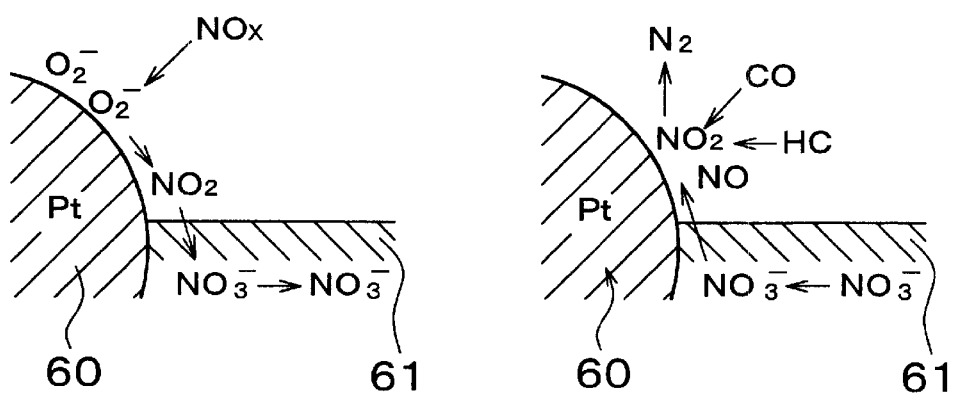
FIG. 10A is a diagram showing NOx purification.
FIG. 10B is a diagram showing NOx purification.

The NOx purification of the active-oxygen discharge/NOx absorption agent is considered to be conducted with the mechanism as shown in FIG. 10. Note that FIGS. 10A and 10B show a particle 60 of platinum Pt, and an active-oxygen discharge/NOx absorption agent 61 including potassium K.

First, when the air-fuel ratio of the introduced exhaust gas is shifted to a considerably lean value, the oxygen concentration in the introduced exhaust gas is significantly increased, so that oxygen $O_2$ adheres to the surface of platinum Pt in the form of $O_2^-$ or $O^{2-}$, as shown in FIG. 10A. On the other hand, NO contained in the introduced exhaust gas reacts with $O_2^-$ or $O^{2-}$ at the surface of platinum Pt into $NO_2$ ($2NO+O_2 \rightarrow 2NO_2$).

Then, $NO_2$ thus produced is absorbed in the active-oxygen discharge/NOx absorption agent 61 while being oxidized on platinum Pt, and diffuses into the active-oxygen discharge/NOx absorption agent 61 in the form of nitrate ions $NO_3^-$ as shown in FIG. 10A while bonding to potassium K. NOx is thus absorbed in the active-oxygen discharge/NOx absorption agent 61.

As long as the oxygen concentration in the introduced exhaust gas is high, $NO_2$ is produced at the surface of platinum Pt. Moreover, as long as the NOx absorbing ability of the active-oxygen discharge/NOx absorption agent 61 has not been saturated, $NO_2$ is absorbed in the active-oxygen discharge/NOx absorption agent 61 to produce nitrate ions $NO_3^-$.

In contrast, if the exhaust air-fuel ratio is shifted to the theoretical or rich value, the oxygen concentration in the introduced exhaust gas is reduced, whereby the $NO_2$ production amount is reduced. As a result, the reaction proceeds in the reverse direction ($NO_3^- \rightarrow NO_2$), so that nitrate ions $NO_3^-$ within the active-oxygen discharge/NOx absorption agent 61 are discharged therefrom in the form of $NO_2$ or NO. In other words, when the oxygen concentration in the introduced exhaust gas is reduced, NOx is discharged from the active-oxygen discharge/NOx absorption agent 61.

At this time, HC and CO in the exhaust gas are oxidized as a result of reaction with oxygen $O_2^-$ or $O^{2-}$ on platinum Pt. Moreover, $NO_2$ or NO discharged from the active-oxygen discharge/NOx absorption agent 61 due to the reduced oxygen concentration in the introduced exhaust gas is reduced to $N_2$ as a result of reaction with unburned HC and CO, as shown in FIG. 10B.

In other words, HC and CO in the introduced exhaust gas are first rapidly oxidized as a result of reaction with oxygen $O_2^-$ or $O^{2-}$ on platinum Pt. If HC and CO still remain after running out of oxygen $O_2^-$ or $O^{2-}$ on platinum Pt, NOx discharged from the active-oxygen discharge/NOx absorption agent 61 as well as NOx emitted from the internal combustion engine are reduced into $N_2$ due to the remaining HC and CO.

If $NO_2$ or NO is no longer present on the surface of platinum Pt, $NO_2$ or NO is successively discharged from the active-oxygen discharge/NOx absorption agent 61 and reduced to $N_2$. Accordingly, when the air-fuel ratio of the exhaust gas is shifted to the theoretical or rich value, NOx is discharged from the active-oxygen discharge/NOx absorption agent 61 and reduced to $N_2$ in a short time.

Thus, when the air-fuel ratio of the exhaust gas is shifted to a lean value, NOx is absorbed in the active-oxygen discharge/NOx absorption agent 61. When the air-fuel ratio of the exhaust gas is shifted to the theoretical or rich value, NOx is discharged from the active-oxygen discharge/NOx absorption agent 61 and reduced to $N_2$ in a short time. Accordingly, NOx can be prevented from being discharged into the atmosphere.

On the other hand, if the air-fuel ratio is maintained at a lean value, the surface of platinum Pt is covered with oxygen and so-called oxygen deterioration of platinum Pt is caused. If such deterioration is caused, the effect of oxidizing $NO_x$ deteriorates and thus the efficiency in absorbing $NO_x$ deteriorates. Thus, the amount of active oxygen discharged from the active-oxygen discharge/NOx absorption agent 61 decreases. However, if the air-fuel ratio is shifted to a rich value, oxygen on the surface of platinum Pt is consumed and thus the oxygen deterioration is eliminated. Accordingly, if the air-fuel ratio is shifted from a rich value to a lean value, the effect of oxidizing $NO_x$ is strengthened and thus the efficiency in absorbing $NO_x$ is enhanced. Thus, the amount of active oxygen discharged from the active-oxygen discharge/NOx absorption agent 61 increases.

Accordingly, while the air-fuel ratio is maintained at a lean value, if the air-fuel ratio is sometimes temporarily shifted from the lean value to a rich value, the oxidation deterioration of platinum Pt is eliminated each time.

Therefore, the amount of active oxygen discharged when the air-fuel ratio assumes a lean value is increased. Thus, the effect of oxidizing particulates on the particulate filter 22 can be promoted.

As described above, in the compression-ignition internal combustion engine, combustion is normally conducted in a range much leaner than the stoichiometric air-fuel ratio (i.e., the theoretical air-fuel ratio; A/F=14.6). Therefore, in the normal engine operation state, the exhaust gas flowing into the filter 22 (i.e., the exhaust gas flowing into the active-oxygen discharge/NOx absorption agent 61) has an extremely lean air-fuel ratio. Consequently, NOx in the exhaust is absorbed in the active-oxygen discharge/NOx absorption agent 61, and the amount of NOx discharged from the active-oxygen discharge/NOx absorption agent 61 is very small.

Accordingly, in the compression-ignition internal combustion engine, 10 it is required to supply a reducing agent to the exhaust gas at predetermined timing before the NOx absorbing ability of the active-oxygen discharge/NOx absorption agent 61 is saturated. This is in order to reduce the oxygen concentration in the exhaust gas and thus cause NOx absorbed in the active-oxygen discharge/NOx absorption agent 61 to be discharged and reduced to $N_2$.

Therefore, in the present embodiment, the ECU 30 estimates the amount of NOx absorbed in the active-oxygen discharge/NOx absorption agent 61, based on the past operating state of the internal combustion engine. Then, when the estimated NOx amount reaches a preset, predetermined value, the air-fuel ratio of the exhaust gas is temporarily shifted to a rich value so as to reduce the oxygen concentration, and simultaneously, the reducing agent is supplied. Such temporary shifting of the air-fuel ratio of the exhaust gas to a rich value is generally referred to as "rich spike".

In the present embodiment, the rich spike is realized by additionally injecting the fuel into the cylinder in the expansion or exhaust stroke of the internal combustion engine. Note that the rich spike may also be realized by supplying the fuel into the exhaust passage 70 upstream of the filter 22.

Thus, by conducting the rich spike at the predetermined timing before the NOx absorbing ability of the active-oxygen discharge/NOx absorption agent 61 is saturated, NOx in the exhaust gas can be successively purified. As a result, NOx can be prevented from being discharged into the atmosphere.

This is the NOx purifying mechanism utilizing the function as the NOx absorbent of the active-oxygen discharge/NOx absorption agent 61.

Thus, in the case of using the active-oxygen discharge/NOx absorption agent 61, when the exhaust gas flowing into the filter 22 has a lean air-fuel ratio, NOx contained in the exhaust gas is absorbed in the active-oxygen discharge/NOx absorption agent 61. When the particulates contained in the exhaust gas adhere to the active-oxygen discharge/NOx absorption agent 61, they are removed by oxidation in a short time due to active oxygen discharged from the active-oxygen discharge/NOx absorption agent 61. In other words, both the particulates and NOx contained in the exhaust gas can be prevented from being discharged into the atmosphere.

When the air-fuel ratio of the exhaust gas flowing into the filter 22 is shifted to a rich value, NOx is discharged from the active-oxygen discharge/NOx absorption agent 61. This NOx is reduced by unburned HC and CO, and thus is not discharged into the atmosphere. In the case where the particulates have been deposited on the filter 22, they are removed by oxidation with active oxygen discharged from the active-oxygen discharge/NOx absorption agent 61.

As described above, in the case where the direction in which the exhaust gas flows through the filter 22 is switched by the exhaust switch valve 71 in order to facilitate the oxidation removal of the particulates on the filter 22, the valve body of the exhaust switch valve 71 is always switched via the neutral position. While the valve body is operating near the neutral position during switching of the exhaust switch valve 71, the exhaust pipe 71 is directly connected to the bypass passage 73. As a result, although during a very short period, the exhaust gas flows from the exhaust pipe 70 into the bypass passage 73 without passing through the filter 22, and discharged into the atmosphere.

If the aforementioned rich spike is conducted at this time so as to discharge NOx from the active-oxygen discharge/NOx absorption agent 61 for reduction, the exhaust gas with a rich air-fuel ratio containing a large amount of hydrocarbon HC and carbon monoxide CO may be undesirably discharged into the atmosphere without passing through the active-oxygen discharge/NOx absorption agent 61.

According to the present embodiment, in order to prevent such a situation, if the timing of switching the exhaust gas flow with the exhaust switch valve 71 matches the timing of conducting the rich spike, switching of the exhaust switch valve 71 is preferentially conducted while inhibiting the rich spike. Thus, simultaneous execution of these two processes is inhibited.

Hereinafter, the exhaust-gas-flow switching control according to the present embodiment will be described in conjunction with the flowchart of FIG. 11.

Figure 11:
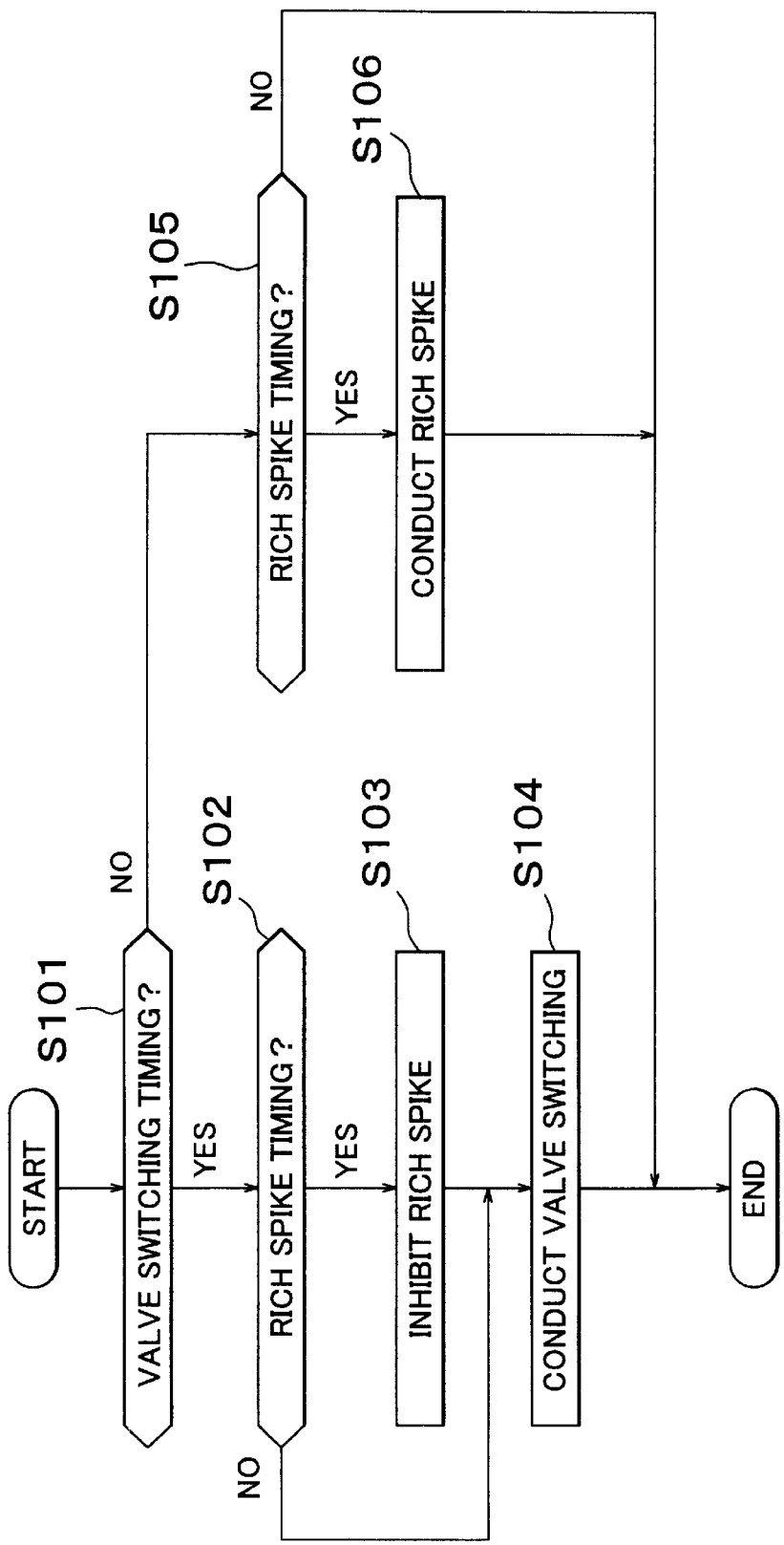
FIG. 11 is a flowchart illustrating exhaust-gas-flow switching control according to a first embodiment.

The flowchart of FIG. 11 shows an exhaust-gas-flow switching control routine. This exhaust-gas-flow switching control routine is pre-stored in the ROM 32 of the ECU 30, and executed by the CPU 34 at regular time intervals.

First, the CPU 34 determines in Step 101 whether or not it is the timing of switching the exhaust switch valve 71. For example, the condition to conduct switching of the exhaust switch valve 71 (hereinafter, referred to as "exhaust-gas-flow switch condition") may be defined as follows: during decelerating operation in which the exhaust gas contains a small amount of harmful components (e.g., particulates); or when the temperature of the filter 22 satisfies a predetermined condition; or when the back pressure upstream of the filter 22 is raised to a predetermined value or more; or two or more of the above conditions are simultaneously satisfied.

If YES in Step 101, the CPU 34 proceeds to Step 102 and determines whether or not it is the timing of conducting the rich spike. Note that, in the present embodiment, as described above, if the amount of NOx absorbed in the active-oxygen discharge/NOx absorption agent 61 supported on the filter 22 reaches a predetermined value, it is determined that the condition to conduct the rich spike is satisfied. Then the rich spike is conducted.

If YES in Step 102, the CPU 34 proceeds to Step 103 and inhibits the rich spike even if it is the timing of conducting the rich spike.

Then, the CPU 34 proceeds to Step 104 and conducts switching of the exhaust switch valve 71 so as to switch the direction of the exhaust gas flow flowing through the filter 22, thereby facilitating oxidation removal of the particulates deposited on the filter 22.

Note that, if NO in Step 102, the CPU 34 also proceeds to Step 104 and conducts switching of the exhaust switch valve 71.

The series of Steps 101 to 104 means that switching of the exhaust switch valve 71 is conducted in preference to the rich spike if the timing of switching the exhaust switch valve 71 matches the timing of conducting the rich spike, namely, means that simultaneous execution of these two processes is inhibited.

If NO in Step 101, the CPU 34 proceeds to Step 105 and determines whether or not it is the timing of conducting the rich spike. If NO in Step 105, the CPU 34 terminates execution of the routine.

If YES in Step 105, the CPU 34 proceeds to Step 106 and conducts the rich spike to supply the exhaust gas at a rich air-fuel ratio into the filter 22 so that NOx absorbed in the active-oxygen discharge/NOx absorption agent 61 is discharged and reduced to $N_2$.

Note that, in the aforementioned embodiment, the active-oxygen discharging agent and the NOx absorbent are supported on the particulate filter. In other embodiments, however, neither the active-oxygen discharging agent nor the NOx absorbent may be supported on the particulate filter. In other words, the particulate filter is not limited to that having both the active-oxygen discharging agent and the NOx absorbent supported thereon, as long as unburned fuel being supplied to the particulate filter is prevented from bypassing the particulate filter and thus being discharged to the outside of the vehicle without being supplied to the particulate filter.

Hereinafter, an exhaust purifying apparatus of an internal combustion engine according to a second embodiment of the invention will be described with reference to FIG. 12. In the aforementioned first embodiment, switching of the exhaust switch valve 71 is conducted in preference to the rich spike if the timing of switching the exhaust switch valve 71 matches the timing of conducting the rich spike. In the second embodiment, however, the rich spike is conducted in preference to switching of the exhaust switch valve 71 in such a case.

The exhaust-gas-flow switching control according to the second embodiment will be described in conjunction with the flowchart of FIG. 12.

Figure 12:
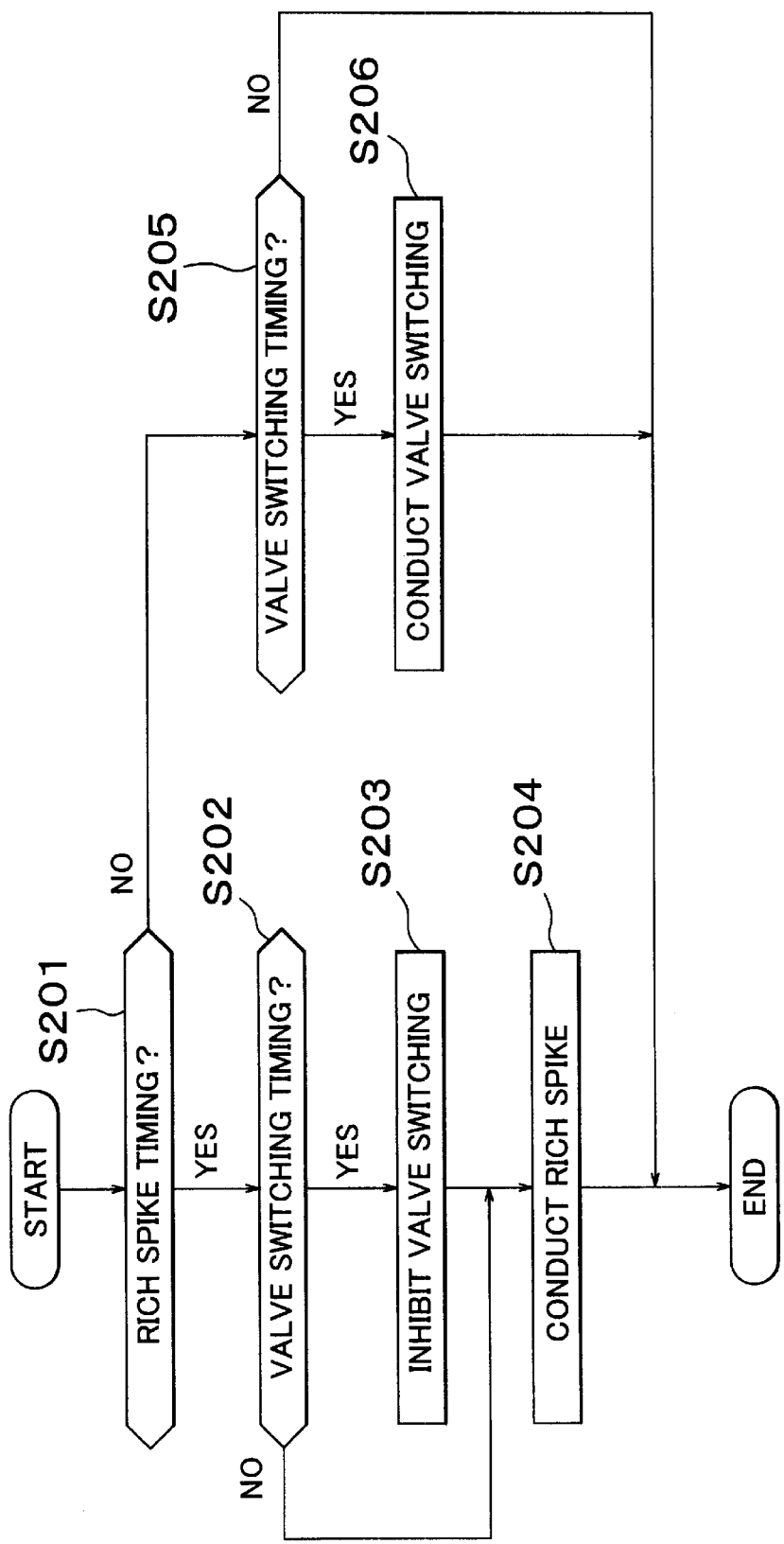
FIG. 12 is a flowchart illustrating exhaust-gas-flow switching control according to a second embodiment.

The flowchart of FIG. 12 shows an exhaust-gas-flow switching control routine. This exhaust-gas-flow switching control routine is pre-stored in the ROM 32 of the ECU 30, and executed by the CPU 34 at regular time intervals.

First, the CPU 34 determines in Step 201 whether or not it is the timing of conducting the rich spike. Note that the condition to conduct the rich spike can be the same as that of the first embodiment If YES in Step 201, the CPU 34 proceeds to Step 202 and determines whether or not it is the timing of switching the exhaust switch valve 71. Note that the exhaust-gas-flow switch condition can be the same as that of the first embodiment.

If YES in Step 202, the CPU 34 proceeds to Step 203 and inhibits switching of the exhaust switch valve 71 even if it is the timing of switching the exhaust switch valve 71.

Then, the CPU 34 proceeds to Step 204 and conducts the rich spike to supply the exhaust gas at a rich air-fuel ratio into the filter 22 so that NOx absorbed in the active-oxygen discharge/NOx absorption agent 61 is discharged and reduced to $N_2$.

Note that, if NO in Step 202, the CPU 34 also proceeds to Step 204 and conducts the rich spike.

The series of Steps 201 to 204 means that the rich spike is conducted in preference to switching of the exhaust switch valve 71 if the timing of switching the exhaust switch valve 71 matches the timing of conducting the rich spike, namely, means that simultaneous execution of these two processes is inhibited.

On the other hand, if NO in Step 201, the CPU 34 proceeds to Step 205 and determines whether or not it is the timing of switching the exhaust switch valve 71. If NO in Step 205, the CPU 34 terminates execution of the routine.

If YES in Step 205, the CPU 34 proceeds to Step 206 and conducts switching of the exhaust switch valve 71 so as to switch the direction of the exhaust gas flow flowing through the filter 22, thereby facilitating oxidation removal of the particulates deposited on the filter 22.

In a modification of the present embodiment as well, a particulate filter having neither the active-oxygen discharging agent nor the NOx absorbent supported thereon may be used.

Hereinafter, an exhaust purifying apparatus of an internal combustion engine according to a third embodiment of the present invention will be described with reference to FIG. 13.

In the exhaust purifying apparatus of the aforementioned first embodiment, the particulates in the exhaust gas cannot be deposited on the filter 22. However, depending on the operation state of the internal combustion engine (e.g., decelerating operation), oxidation removal of the particulates on the filter 22 may not sufficiently be conducted, or the capability to remove the particulates by oxidation may be degraded due to a low temperature of the exhaust gas. In such a case, in order to prevent the particulates from being deposited on the filter 22 in a preset amount or more, a method of controlling an exhaust gas flow such that the exhaust gas flows so as to bypass the filter 22 is possible (hereinafter, such a method is referred to as filter bypass control).

If the rich spike for purifying NOx is conducted during the filter bypass control, i.e., while the exhaust gas is flowing so as to bypass the filter 22, the exhaust gas with a rich air-fuel ratio containing a large amount of hydrocarbon HC and carbon monoxide CO is undesirably discharged into the atmosphere without passing through the active-oxygen discharge/NOx absorption agent 61.

In the third embodiment, if the timing of conducting the rich spike has come during the filter bypass control, the rich spike is conducted preferentially, and during the rich spike, the exhaust switch valve 71 is switched such that the exhaust gas flows through the filter 22.

The exhaust-gas-flow switching control of the third embodiment will now be described in conjunction with the flowchart of FIG. 13.

Figure 13:
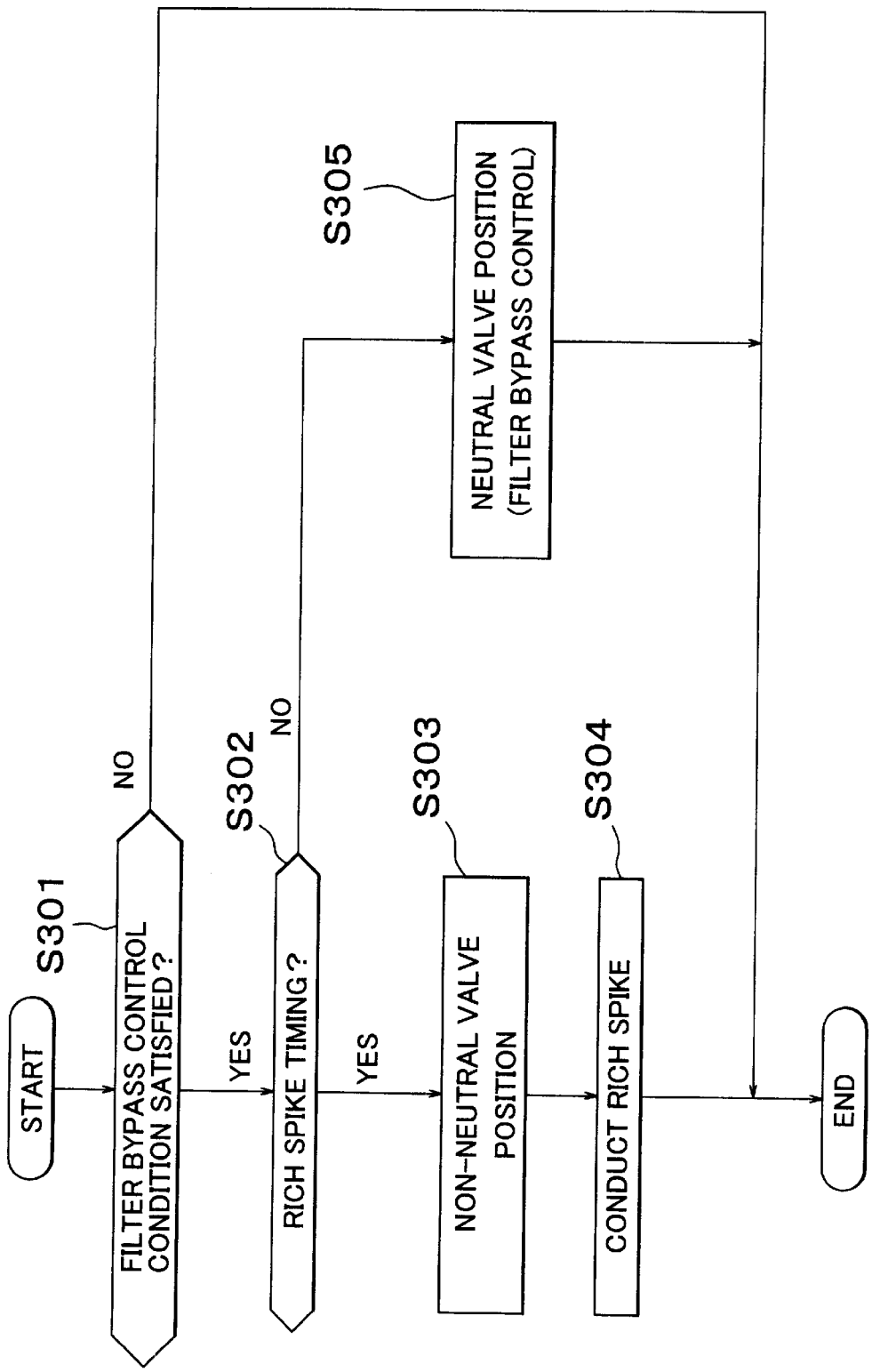
FIG. 13 is a flowchart illustrating exhaust-gas-flow switching control according to a third embodiment.

The flowchart of FIG. 13 shows an exhaust-gas-flow switching control routine. This exhaust-gas-flow switching control routine is pre-stored in the ROM 32 of the ECU 30 and executed by the CPU 34 at regular time intervals.

First, the CPU 34 determines in Step 301 whether or not the condition to conduct the filter bypass control is satisfied. Note that whether or not the condition to conduct the filter bypass control is satisfied can be determined from the operating state of the internal combustion engine (e.g., decelerating operation).

If YES in Step 301, the CPU 34 proceeds to Step 302 and determines whether or not it is the timing of conducting the rich spike. Note that the condition to conduct the rich spike can be the same as that of the first embodiment.

If YES in Step 302, the CPU 34 proceeds to Step 303. In Step 303, the CPU 34 does not conduct the filter bypass control even if the condition to conduct the filter bypass control has been satisfied, but switches the exhaust switch valve 71 such that the exhaust gas flows through the filter 22. In other words, the exhaust gas is prevented from bypassing the filter 22 (non-neutral valve position).

Then, the CPU 34 proceeds to Step 304 and conducts the rich spike to supply the exhaust gas at a rich air-fuel ratio into the filter 22 so that NOx absorbed in the active-oxygen discharge/NOx absorption agent 61 is discharged and reduced to $N_2$.

In the series of Steps 301 to 304, the filter bypass control is discontinued if the timing of conducting the rich spike has come during the filter bypass control, and the rich spike is conducted such that the exhaust gas flows through the filter 22. Namely, the series of Steps 301 to 304 means that simultaneous execution of these two processes is inhibited.

On the other hand, if NO in Step 302, the CPU 34 proceeds to Step 305, and conducts the filter bypass control to switch the exhaust switch valve 71 to the neutral position. Thus, the exhaust gas is caused to bypass the filter 22, so that the particulates are prevented from being deposited on the filter 22. Then, the CPU 34 terminates execution of the routine.

Note that, if NO in Step 301, the CPU 34 terminates execution of the routine. In other words, the exhaust switch valve 71 is switched according to the normal control.

The invention is also possible even in the case where a noble metal catalyst such as platinum Pt and an NO absorbent are supported on the support layer formed on the filter 22. In this case, however, the solid line showing the oxidation-removable particulate amount G is slightly shifted to the right with respect to that shown in FIG. 9. In this case, active oxygen is discharged from $NO_2$ or $SO_3$ retained on the surface of platinum Pt.

Moreover, a catalyst that can adsorb and retain $NO_2$ or $SO_3$ thereon as well as discharge active oxygen from the adsorbed $NO_2$ or $SO_3$ may be used as the active-oxygen discharging agent.

In a modification of the present embodiment as well, a particulate filter having neither the active-oxygen discharging agent nor the NOx absorbent supported thereon can be used.

Hereinafter, an exhaust purifying apparatus of an internal combustion engine according to a fourth embodiment of the invention will be described. The structure of the present embodiment is substantially the same as that of the first embodiment except that a catalyst for oxidizing the particulates is not limited to the active-oxygen discharging agent, and that the NOx absorbent is not supported on the particulate filter.

Figure 14:
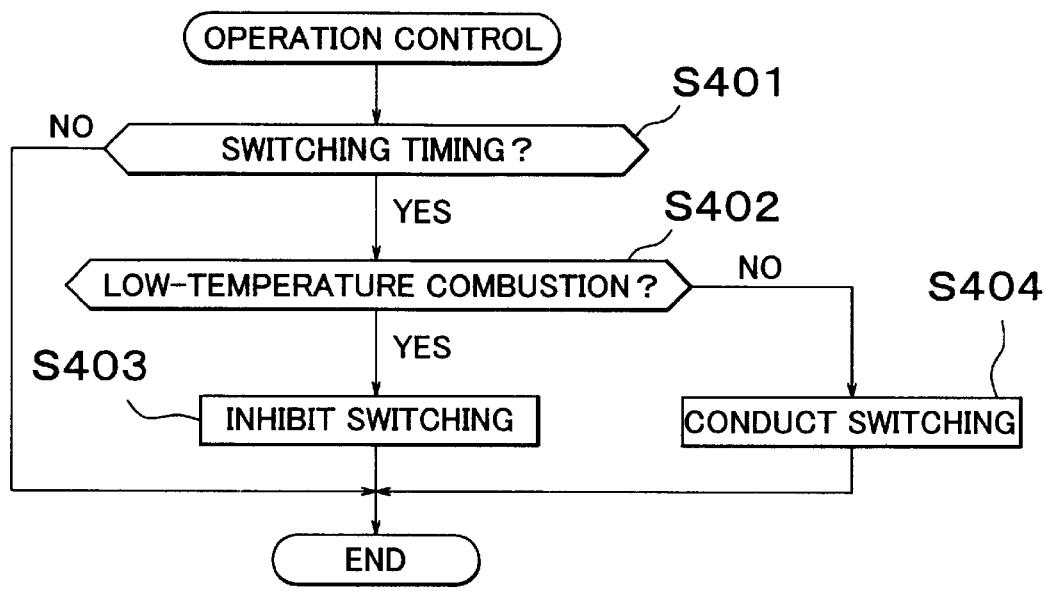
FIG. 14 is a flowchart illustrating a method for controlling operation of the exhaust purifying apparatus of the internal combustion engine according to a fourth embodiment.

FIG. 14 is a flowchart illustrating a method for controlling operation of the exhaust purifying apparatus of the internal combustion engine according to the present embodiment. The routine of FIG. 14 is executed at predetermined time intervals during operation of the internal combustion engine. As shown in FIG. 14, when the routine is started, whether or not it is the timing of switching the exhaust switch valve 71 is first determined in Step 401. If YES, the routine proceeds to Step 402. If NO, the routine is terminated. For example, determination of YES is made during decelerating operation of the engine after a predetermined time period has passed since the exhaust switch valve 71 was switched. In Step 402, it is determined whether or not low-temperature combustion that will be described later is being conducted. If YES, the routine proceeds to Step 403. If NO, the routine proceeds to Step 404. In Step 403, switching of the exhaust switch valve 71 is inhibited. More specifically, the exhaust switch valve 71 is inhibited from being switched between the forward flow position (dashed line in FIG. 3) and the reverse flow position (solid line in FIG. 3) in order to prevent the exhaust switch valve 71 from being located at the bypass position (chain line in FIG. 3). In Step 404, switching of the exhaust switch valve 71 is conducted. More specifically, the exhaust switch valve 71 is switched from the forward flow position to the reverse flow position, or from the reverse flow position to the forward flow position. At this time, the exhaust switch valve 71 is caused to pass the bypass position.

Figure 15:
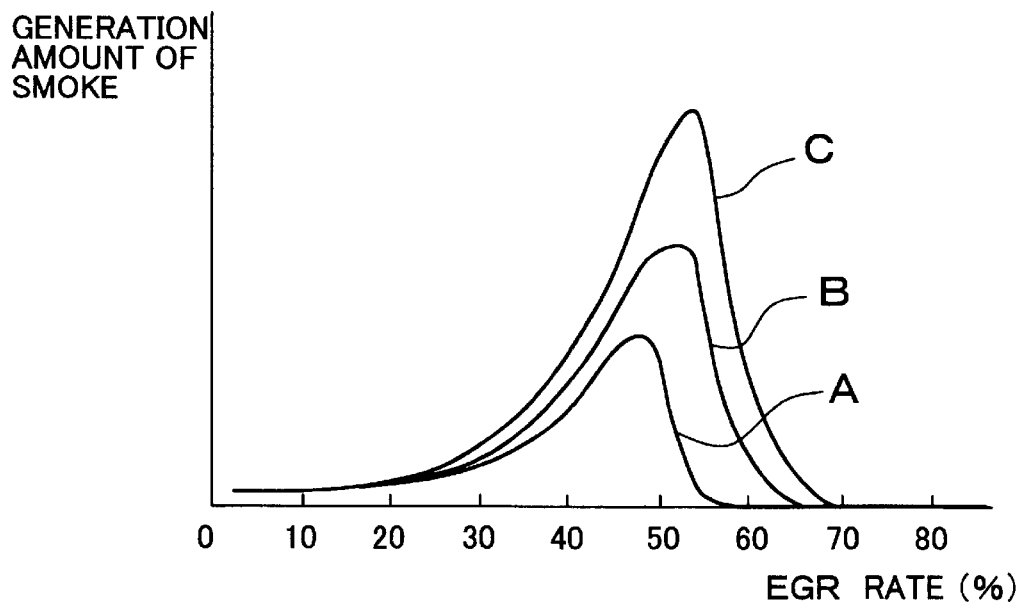
FIG. 15 is a diagram showing a smoke generation amount.

Hereinafter, the aforementioned low-temperature combustion will be described. In the internal combustion engine shown in FIG. 1, as the EGR rate (EGR gas amount/(EGR gas amount+intake air amount)) is increased, the smoke generation amount gradually increases to the peak. If the EGR rate is further increased, the smoke generation amount decreases rapidly. This will be described with reference to FIG. 15. FIG. 15 shows the relation between the EGR rate and smoke with the cooling degree of the EGR gas being varied. Note that, in FIG. 15, curve A shows the case where the EGR gas was intensely cooled so that the EGR gas temperature was kept at approximately 90° C., curve B shows the case where the EGR gas was cooled with a small cooling apparatus, and curve C shows the case where the EGR gas was not forcibly cooled.

As shown by curve A in FIG. 15, if the EGR gas is intensely cooled, the smoke generation amount reaches the peak at the EGR rate slightly lower than 50 percent. In this case, smoke is hardly generated when the EGR rate is increased to approximately 55 percent or more. As shown by curve B in FIG. 15, if the EGR gas is slightly cooled, the smoke generation amount reaches the peak at the EGR rate slightly higher than 50 percent. In this case, smoke is hardly generated when the EGR rate is increased to approximately 65 percent or more. As shown by curve C in FIG. 15, if the EGR gas is not forcibly cooled, the smoke generation amount reaches the peak at the EGR rate of around 55 percent. In this case, smoke is hardly generated when the EGR rate is increased to approximately 70 percent or more. No smoke is generated at the EGR gas rate of 55 percent or more. This is because, owing to the endothermic effect of the EGR gas, the temperature of fuel and its surrounding gas does not rise very much during combustion, i.e., the low-temperature combustion is conducted, so that hydrocarbon does not grow to soot.

This low-temperature combustion is characterized by the ability to reduce the NOx generation amount while suppressing smoke generation regardless of the air-fuel ratio. In other words, if the air-fuel ratio is shifted to a rich value, the fuel becomes excessive. However, since the combustion temperature is suppressed to a low temperature, the excess fuel does not grow to soot, so that smoke is not generated. At this time, NOx is also generated only in an extremely small amount. On the other hand, if the average air-fuel ratio has a lean value, or even if the air-fuel ratio is the theoretical air-fuel ratio, a slight amount of soot would be produced at a high combustion temperature. Under the low-temperature combustion, however, the combustion temperature is suppressed to a low temperature, so that smoke is not generated at all, and NOx is also generated only in an extremely small amount.

Figure 16A:
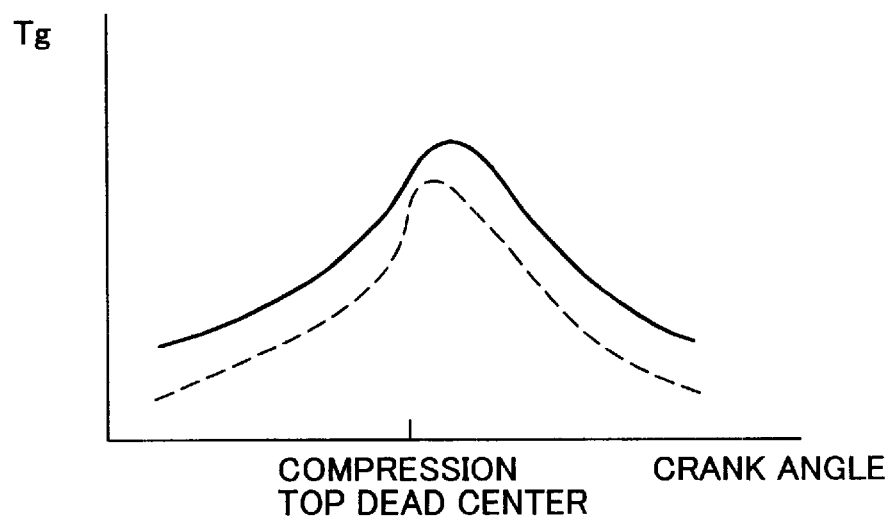
Figure 16B:
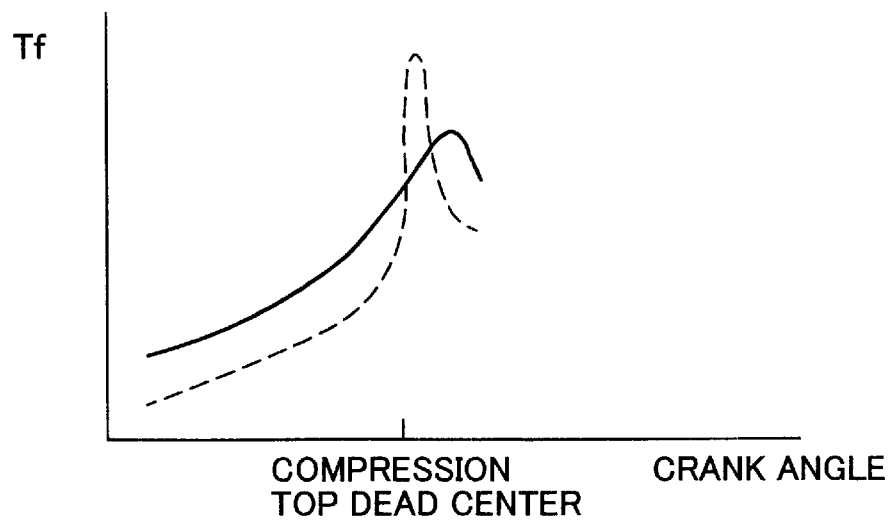
FIG. 16B is a diagram showing a gas temperature in a combustion chamber

In this low-temperature combustion, the temperature of fuel and its surrounding gas is reduced, but the exhaust gas temperature is raised. This will be described with reference to FIGS. 16A and 16B. The solid line in FIG. 16A shows the relation between an average gas temperature Tg within the combustion chamber 5 and a crank angle in the low-temperature combustion. The dashed line in FIG. 16A shows the relation between an average gas temperature Tg within the combustion chamber 5 and a crank angle in the normal combustion. The solid line in FIG. 16B shows the relation between a temperature of fuel and its surrounding gas Tf and a crank angle in the low-temperature combustion. The dashed line in FIG. 16B shows the relation between a temperature of fuel and its surrounding gas Tf and a crank angle in the normal combustion.

The amount of EGR gas in the low-temperature combustion is larger than that in the normal combustion. Therefore, as shown in FIG. 16A, before the compression top dead center, i.e., during the compression stroke, the average gas temperature Tg of the low-temperature combustion shown by the solid line is higher than that of the normal combustion shown by the dashed line. Note that, at this time, as shown in FIG. 16B, the temperature of fuel and its surrounding gas Tf is substantially the same as the average gas temperature Tg. Then, combustion is started near the compression top dead center. In the low-temperature combustion, however, as shown by the solid line of FIG. 16B, the temperature of fuel and its surrounding gas Tf does not rise very much due to the endothermic effect of the EGR gas. In contrast, in the normal combustion, a large amount of oxygen is present around the fuel, so that the temperature of fuel and its surrounding gas Tf significantly rises as shown by the dashed line in FIG. 16B. Thus, in the normal combustion, the temperature of fuel and its surrounding gas Tf becomes considerably higher than that in the low-temperature combustion. However, the other portion of the gas temperature, i.e., most of the gas temperature, is lower in the normal combustion than in the low-temperature combustion. Accordingly, as shown in FIG. 16A, the average gas temperature Tg within the combustion chamber 5 near the compression top dead center is higher in the low-temperature combustion than in the normal combustion. As a result, as shown in FIG. 16A, the burned gas temperature within the combustion chamber 5 after the combustion is completed is higher in the low-temperature combustion than in the normal combustion. Accordingly, the exhaust gas temperature is high in the low-temperature combustion.

Thus, the low-temperature combustion reduces the smoke generation amount, i.e., the discharged particulate amount, and raises the exhaust gas temperature. Accordingly, by switching from the normal combustion to the low-temperature combustion during operation of the engine, the discharged particulate amount can be reduced as well as the temperature of the particulate filter 22 can be raised. In contrast, if the combustion is switched from the low-temperature combustion to the normal combustion, the temperature of the particulate filter 22 is reduced. At this time, the discharged particulate amount is increased. In either case, it is possible to control the discharged particulate amount and the temperature of the particulate filter 22 by switching between the normal combustion and the low-temperature combustion.

Figure 17:
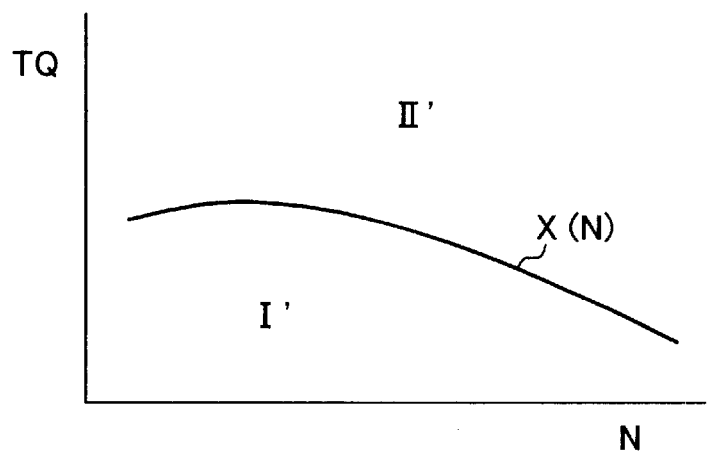
FIG. 17 is a diagram showing operation regions I' and no'.
Figure 18:
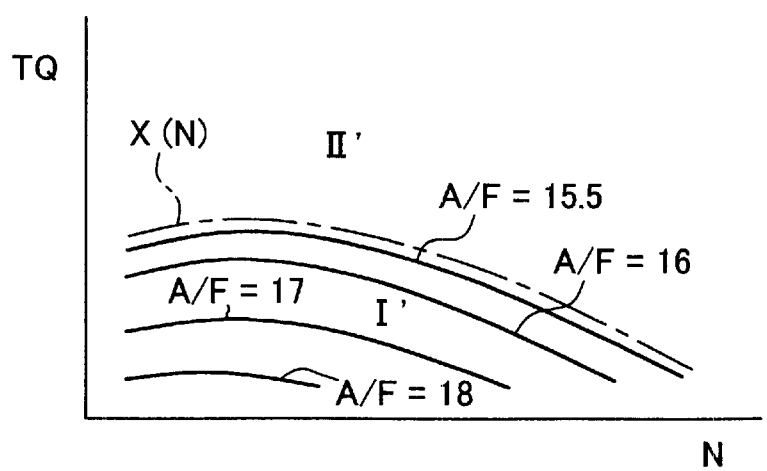
FIG. 18 is a diagram showing an air-fuel ratio A/F.
Figure 19:
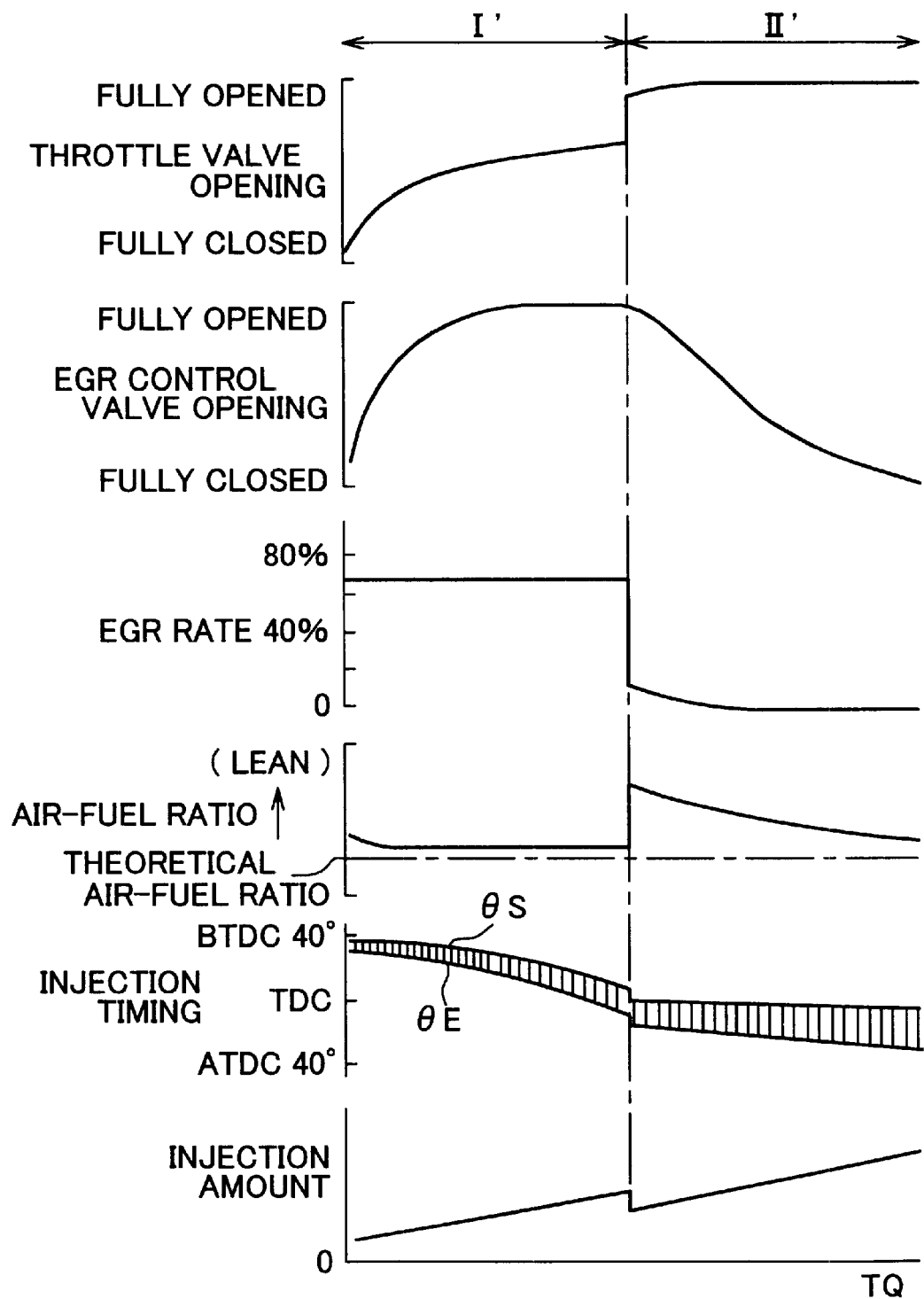

As the required torque TQ of the engine is increased, i.e., as the fuel injection amount is increased, the temperature of fuel and its surrounding gas during combustion is increased. Therefore, it is difficult to conduct the low-temperature combustion. More specifically, the low-temperature combustion can be conducted only during low and medium load operation of the engine in which the heat generation amount resulting from the combustion is relatively small. In FIG. 17, the region I' indicates first combustion in which the inactive gas amount in the combustion chamber 5 is larger than the inactive gas amount corresponding to the peak soot generation amount. In other words, the region I' indicates an operation region where the low-temperature combustion can be conducted. The region II' indicates second combustion in which the inactive gas amount in the combustion chamber 5 is smaller than the inactive gas amount corresponding to the peak soot generation amount. In other words, the region II' indicates an operation region where only the normal combustion can be conducted. FIG. 18 shows the target air-fuel ratio A/F when conducting the low-temperature combustion in the operation region I'. FIG. 19 shows opening of the throttle valve 17, opening of the EGR control valve 25, EGR rate, air-fuel ratio, injection start timing θS, injection finish timing θE, and injection amount according to the required torque TQ when conducting the low-temperature combustion in the operation region I'. Note that FIG. 19 also shows the opening of the throttle valve 17 and the like when conducting the normal combustion in the operation region II'. It can be seen from FIGS. 18 and 19 that when the low-temperature combustion is conducted in the operation region I', the EGR rate is 55 percent or more and the air-fuel ratio A/F is a lean air-fuel ratio of about 15.5 to about 18. Note that, as described above, during the low-temperature combustion in the operation region I', smoke is hardly generated even if the air-fuel ratio is shifted to a rich value.

More specifically, in the present embodiment, during low-temperature combustion in which the exhaust gas at a relatively small air-fuel ratio is flowing, switching of the exhaust switch valve 71 is inhibited in Step 403, so that the exhaust switch valve 71 is inhibited from being located at the bypass position. On the other hand, during combustion other than the low-temperature combustion in which the exhaust gas at a relatively large air-fuel ratio is flowing, switching of the exhaust switch valve 71 is conducted in Step 404 so as to be caused to pass the bypass position. Although not shown in the figure, if the timing of switching the exhaust switch valve 71 has been reached during the low-temperature combustion in which the exhaust gas at a relatively small air-fuel ratio is flowing, the combustion is first switched from the low combustion to the normal combustion with switching of the exhaust switch valve 71 inhibited, in order to increase the air-fuel ratio of the exhaust gas. Then, switching of the exhaust switch valve 71 is conducted in the same manner as that of Step 404. As described above, the low-temperature combustion can be conducted during the low and medium load operation of the engine. The low-temperature combustion can also be conducted when the particulate filter 22 is poisoned with SOx, in order to restore the particulate filter 22.

According to the present embodiment, during the low-temperature combustion in which the exhaust gas at a relatively small air-fuel ratio is flowing, the exhaust switch valve 71 is inhibited from being located at the bypass position in Step 403. Accordingly, during the low-temperature combustion in which the exhaust gas at a relatively small air-fuel ratio and containing HC, CO, unburned fuel and the like is flowing, the exhaust gas can be prevented from bypassing the particulate filter 22 and thus being discharged into the atmosphere without passing through the particulate filter 22.

Hereinafter, an exhaust purifying apparatus of an internal combustion engine according to a fifth embodiment of the invention will be described. The structure of the present embodiment is substantially the same as that of the first embodiment except that a catalyst for oxidizing the particulates is not limited to the active-oxygen discharging agent.

More specifically, in the exhaust purifying apparatus of the internal combustion engine according to the present embodiment, the NOx absorbent is supported on the particulate filter.

A method for controlling operation of the exhaust purifying apparatus of the internal combustion engine according to the present embodiment is substantially the same as that of the fourth embodiment shown in FIG. 14. More specifically, in the present embodiment, in the case where NOx should be discharged from the NOx absorbent and the low-temperature combustion is being conducted in which the exhaust gas at a relatively small air-fuel ratio is flowing, switching of the exhaust switch valve 71 is inhibited in the same manner as that of Step 403, so that the exhaust switch valve 71 is inhibited from being located at the bypass position. In the case where NOx need not be discharged from the NOx absorbent and combustion other than the low-temperature combustion is being conducted in which the exhaust gas at a relatively large air-fuel ratio is flowing, switching of the exhaust switch valve 71 is conducted in the same manner as that of Step 404, so that the exhaust switch valve 71 is caused to pass the bypass position.

According to the present embodiment, the exhaust switch valve 71 is inhibited from being located at the bypass position during the low-temperature combustion in which the air-fuel ratio of the exhaust gas is made relatively small and the NOx absorbent is discharging NOx. Therefore, while the exhaust gas for discharging NOx from the NOx absorbent, which has a relatively small air-fuel ratio and contains HC, CO, unburned fuel and the like, is flowing, the exhaust gas can be prevented from bypassing the particulate filter 22 and thus being discharged into the atmosphere without passing through the particulate filter 22.

Hereinafter, an exhaust purifying apparatus of an internal combustion engine according to a sixth embodiment of the invention will be described. The structure of the present embodiment is substantially the same as that of the first embodiment except that a catalyst for oxidizing the particulates is not limited to the active-oxygen discharging agent, and that the NOx absorbent is not supported on the particulate filter.

Figure 20:
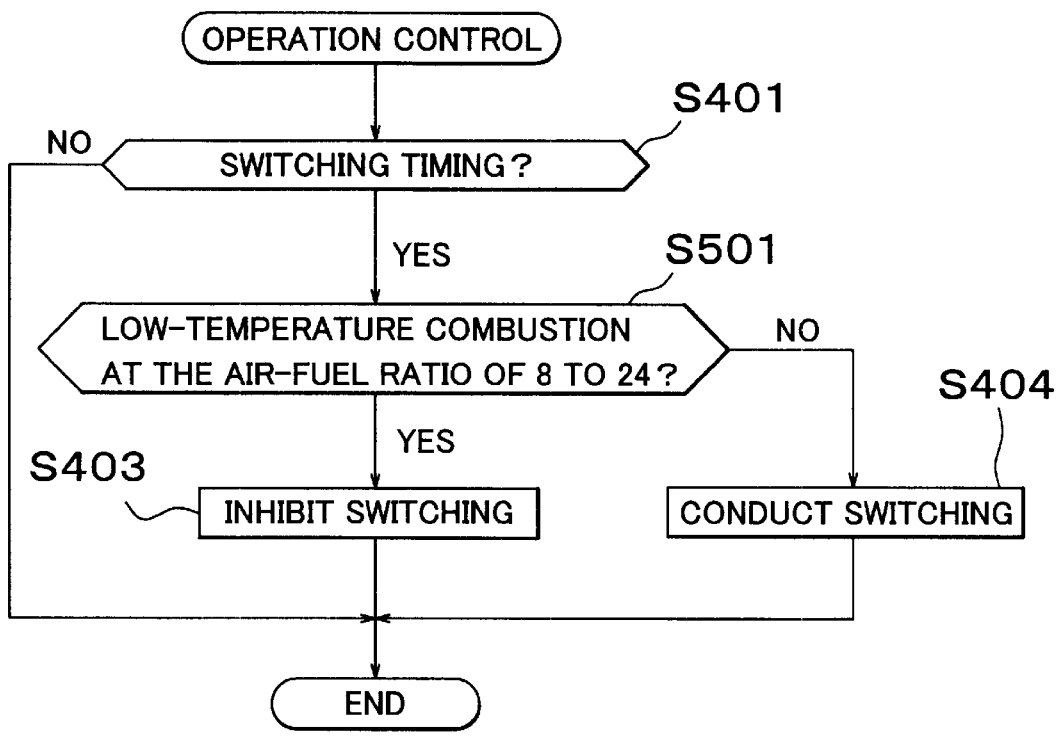
FIG. 20 is a flowchart illustrating a method for controlling operation of the exhaust purifying apparatus of the internal combustion engine according to a sixth embodiment.

FIG. 20 is a flowchart illustrating a method for controlling operation of the exhaust purifying apparatus of the internal combustion engine according to the present embodiment. The routine of FIG. 20 is executed at predetermined time intervals during operation of the internal combustion engine. As shown in FIG. 20, when the routine is started, whether or not it is the timing of switching the exhaust switch valve 71 is first determined in Step 401. If YES, the routine proceeds to Step 501. If NO, the routine is terminated. For example, determination of YES is made during decelerating operation of the engine after a predetermined time period has passed since the exhaust switch valve 71 was switched. In Step 501, it is determined whether or not low-temperature combustion at the air-fuel ratio of 8 to 24 that will be described later is being conducted. If YES, the routine proceeds to Step 403. If NO, the routine proceeds to Step 404. In Step 403, switching of the exhaust switch valve 71 is inhibited. More specifically, the exhaust switch valve 71 is inhibited from being switched between the forward flow position (dashed line in FIG. 3) and the reverse flow position (solid line in FIG. 3) in order to prevent the exhaust switch valve 71 from being located at the bypass position (chain line in FIG. 3). In Step 404, switching of the exhaust switch valve 71 is conducted. More specifically, the exhaust switch valve 71 is switched from the forward flow position to the reverse flow position, or from the reverse flow position to the forward flow position. At this time, the exhaust switch valve 71 is caused to pass the bypass position.

More specifically, in the present embodiment, during low-temperature combustion at the air-fuel ratio 8 to 24 in which the exhaust gas at a relatively small air-fuel ratio is flowing, switching of the exhaust switch valve 71 is inhibited in Step 403, so that the exhaust switch valve 71 is inhibited from being located at the bypass position. On the other hand, during combustion other than the low-temperature combustion at the air-fuel ratio 8 to 24 in which the exhaust gas at a relatively large air-fuel ratio is flowing, switching of the exhaust switch valve 71 is conducted in Step 404 so as to be caused to pass the bypass position. Although not shown in the figure, if the timing of switching the exhaust switch valve 71 has been reached during the low-temperature combustion at the air-fuel ratio 8 to 24 in which the exhaust gas at a relatively small air-fuel ratio is flowing, the combustion is first switched from the low combustion at the air-fuel ratio 8 to 24 to the normal combustion with switching of the exhaust switch valve 71 inhibited, in order to increase the air-fuel ratio of the exhaust gas. Then, switching of the exhaust switch valve 71 is conducted in the same manner as that of Step 404. As described above, the low-temperature combustion at the air-fuel ratio 8 to 24 can be conducted during the low and medium load operation of the engine. The low-temperature combustion can also be conducted when the particulate filter 22 is poisoned with SOx, in order to restore the particulate filter 22.

According to the present embodiment, during the low-temperature combustion at the air-fuel ratio 8 to 24 in which the exhaust gas at a relatively small air-fuel ratio is flowing, the exhaust switch valve 71 is inhibited from being located at the bypass position in Step 403. Accordingly, during the low-temperature combustion at the air-fuel ratio 8 to 24 in which the exhaust gas at a relatively small air-fuel ratio and containing HC, CO, unburned fuel and the like is flowing, the exhaust gas can be prevented from bypassing the particulate filter 22 and thus being discharged into the atmosphere without passing through the particulate filter 22.

Hereinafter, an exhaust purifying apparatus of an internal combustion engine according to a seventh embodiment of the invention will be described. The structure of the present embodiment is substantially the same as that of the first embodiment except that a catalyst for oxidizing the particulates is not limited to the active-oxygen discharging agent. More specifically, in the exhaust purifying apparatus of the internal combustion engine according to the present embodiment, the NOx absorbent is supported on the particulate filter.

A method for controlling operation of the exhaust purifying apparatus of the internal combustion engine according to the present embodiment is substantially the same as that of the sixth embodiment shown in FIG. 20. More specifically, in the present embodiment, in the case where NOx should be discharged from the NOx absorbent and the low-temperature combustion at the air-fuel ratio 8 to 24 is being conducted in which the exhaust gas at a relatively small air-fuel ratio is flowing, switching of the exhaust switch valve 71 is inhibited in the same manner as that of Step 403, so that the exhaust switch valve 71 is inhibited from being located at the bypass position. In the case where NOx need not be discharged from the NOx absorbent and combustion other than the low-temperature combustion at the air-fuel ratio 8 to 24 is being conducted in which the exhaust gas at a relatively large air-fuel ratio is flowing, switching of the exhaust switch valve 71 is conducted in the same manner as that of Step 404, so that the exhaust switch valve 71 is caused to pass the bypass position.

According to the present embodiment, the exhaust switch valve 71 is inhibited from being located at the bypass position during the low-temperature combustion at the air-fuel ratio 8 to 24 in which the air-fuel ratio of the exhaust gas is made relatively small and the NOx absorbent is discharging NOx. Therefore, while the exhaust gas for discharging NOx from the NOx absorbent, which has a relatively small air-fuel ratio and contains HC, CO, unburned fuel and the like, is flowing, the exhaust gas can be prevented from bypassing the particulate filter 22 and thus being discharged into the atmosphere without passing through the particulate filter 22.

Hereinafter, an exhaust purifying apparatus of an internal combustion engine according to a eighth embodiment of the invention will be described. The structure of the present embodiment is substantially the same as that of the first embodiment except that a catalyst for oxidizing the particulates is not limited to the active-oxygen discharging agent, and that the NOx absorbent is not supported on the particulate filter.

Figure 21:
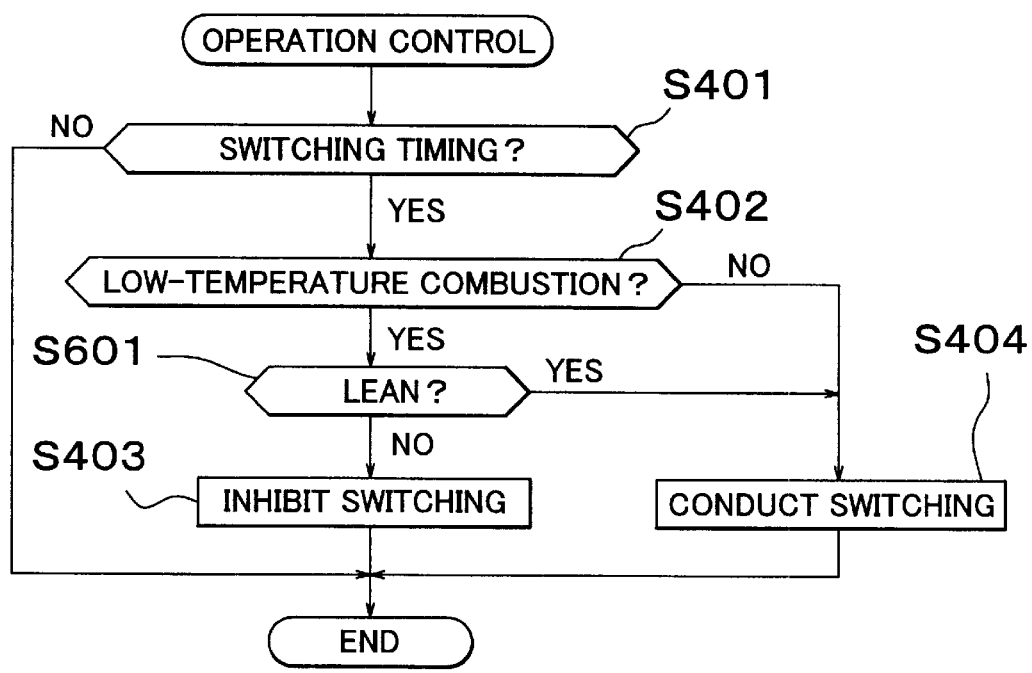
FIG. 21 is a flowchart illustrating a method for controlling operation of the exhaust purifying apparatus of the internal combustion engine according to a eighth embodiment.

FIG. 21 is a flowchart illustrating a method for controlling operation of the exhaust purifying apparatus of the internal combustion engine according to the present embodiment. The routine of FIG. 21 is executed at predetermined time intervals during operation of the internal combustion engine. As shown in FIG. 21, when the routine is started, whether or not it is the timing of switching the exhaust switch valve 71 is first determined in Step 401. If YES, the routine proceeds to Step 402. If NO, the routine is terminated. For example, determination of YES is made during decelerating operation of the engine after a predetermined time period has passed since the exhaust switch valve 71 was switched. In Step 402, it is determined whether or not the low-temperature combustion is being conducted. If YES, the routine proceeds to Step 601. If NO, the routine proceeds to Step 404. In Step 601, it is determined whether the exhaust-gas air-fuel ratio, i.e., the air-fuel ratio of the exhaust gas flowing into the particulate filter 22, is lean or not, based on an output value of an air-fuel ratio sensor (not shown) for detecting the exhaust-gas air-fuel ratio. If NO, the routine proceeds to Step 403. If YES, the routine proceeds to Step 404. In Step 403, switching of the exhaust switch valve 71 is inhibited. More specifically, in order to prevent the exhaust switch valve 71 from being located at the bypass position (chain line in FIG. 3), the exhaust switch valve 71 is inhibited from being switched between the forward flow position (dashed line in FIG. 3) and the reverse flow position (solid line in FIG. 3). In Step 404, switching of the exhaust switch valve 71 is conducted. More specifically, the exhaust switch valve 71 is switched from the forward flow position to the reverse flow position, or from the reverse flow position to the forward flow position. At this time, the exhaust switch valve 71 is caused to pass the bypass position.

In other words, in the present embodiment, during the low-temperature combustion in which the exhaust-gas air-fuel ratio is stoichiometric or rich, switching of the exhaust switch valve 71 is inhibited in Step 403, so that the exhaust switch valve 71 is inhibited from being located at the bypass position. On the other hand, if the exhaust-gas air-fuel ratio is lean, or during combustion other than the low-temperature operation, switching of the exhaust switch valve 71 is conducted in Step 404, so that the exhaust switch valve 71 is caused to pass the bypass position. Although not shown in the figure, if the timing of switching the exhaust switch valve 71 has come during the low-temperature combustion in which the exhaust-gas air-fuel ratio becomes stoichiometric or rich, the combustion is first switched from the low combustion to the normal combustion with switching of the exhaust switch valve 71 inhibited, in order to increase the exhaust-gas air-fuel ratio. Then, switching of the exhaust switch valve 71 is conducted in the same manner as that of Step 404. Note that the low-temperature combustion can be conducted during the low and medium load operation of the engine. The low-temperature combustion can also be conducted when the particulate filter 22 is poisoned with: SOx, in order to restore the particulate filter 22.

According to the present embodiment, during the low-temperature combustion in which the exhaust-gas air-fuel ratio is stoichiometric or rich, the exhaust switch valve 71 is inhibited from being located at the bypass position in Step 403. Accordingly, during the low-temperature combustion in which the exhaust gas at a relatively small air-fuel ratio and containing HC, CO, unburned fuel and the like is flowing, the exhaust gas can be prevented from bypassing the particulate filter 22 and thus being discharged into the atmosphere without passing through the particulate filter 22.

Hereinafter, an exhaust purifying apparatus of an internal combustion engine according to a ninth embodiment of the invention will be described. The structure of the present embodiment is substantially the same as that of the first embodiment except that a catalyst for oxidizing the particulates is not limited to the active-oxygen discharging agent. More specifically, in the exhaust purifying apparatus of the internal combustion engine according to the present embodiment, the NOx absorbent is supported on the particulate filter.

A method for controlling operation of the exhaust purifying apparatus of the internal combustion engine according to the present embodiment is substantially the same as that of the eighth embodiment shown in FIG. 21. More specifically, in the present embodiment, in the case where NOx should be discharged from the NOx absorbent and the low-temperature combustion is being conducted in which the exhaust-gas air-fuel ratio is stoichiometric or rich, switching of the exhaust switch valve 71 is inhibited in the same manner as that of Step 403, so that the exhaust switch valve 71 is inhibited from being located at the bypass position. On the other hand, in the case where NOx need not be discharged from the NOx absorbent and the exhaust-gas air-fuel ratio is lean, or combustion other than the low-temperature combustion is being conducted, switching of the exhaust switch valve 71 is conducted in the same manner as that of Step 404, so that the exhaust switch valve 71 is caused to pass the bypass position.

According to the present embodiment, the exhaust switch valve 71 is inhibited from being located at the bypass position during the low-temperature combustion in which the exhaust-gas air-fuel ratio is made stoichiometric or rich and the NOx absorbent is discharging NOx. Therefore, while the exhaust gas for discharging NOx from the NOx absorbent, which has a relatively small air-fuel ratio and contains HC, CO, unburned fuel and the like, is flowing, this exhaust gas can be prevented from bypassing the particulate filter 22 and thus being discharged into the atmosphere without passing through the particulate filter 22.

Hereinafter, an exhaust purifying apparatus of an internal combustion engine according to a tenth embodiment of the invention will be described. The structure of the present embodiment is substantially the same as that of the first embodiment except that a catalyst for oxidizing the particulates is not limited to the active-oxygen discharging agent.

More specifically, in the exhaust purifying apparatus of the internal combustion engine according to the present embodiment, the NOx absorbent is supported on the particulate filter.

In the present embodiment, the exhaust switch valve 71 is normally located at the bypass position when the particulate oxidation capability of the particulate filter 22 is lower than a predetermined level. A threshold as the predetermined level may be set to such a value that shows the particulate oxidation capability of the particulate filter 22 has actually been reduced, or may be set to such a value that shows the particulate oxidation reaction of the particulate filter 22 has not yet been reduced, but may possibly be reduced. On the other hand, in the case where NOx should be discharged from the NOx absorbent, the exhaust switch valve 71 is inhibited from being located at the bypass position, even if the particulate oxidation capability of the particulate filter 22 is lower than the predetermined level.

According to the present embodiment, normally, when the particulate oxidation capability of the particulate filter 22 is lower than the predetermined level, increase in deposition amount of the particulates on the particulate filter 22 can be suppressed resulting from the fact that the exhaust gas possibly containing particulates passes through the particulate filter 22. Moreover, in the case where NOx is to be discharged from the NOx absorbent, the exhaust gas containing HC, CO, unburned fuel and the like in order to discharge NOx from the NOx absorbent can be prevented from bypassing the particulate filter 22 and thus being directly discharged into the atmosphere, even if the particulate oxidation capability of the particulate filter 22 is lower than the predetermined level.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An exhaust purifying apparatus of an internal combustion engine, comprising:
   a filter that temporarily traps a plurality of particulates contained in an exhaust gas and removes the particulates by oxidation;
   a valve having a switching operation that alternately switches between a first flow passage to feed the exhaust gas to the first side of the filter and a second flow passage to feed the exhaust gas to the second side of the filter, during switching, the exhaust gas flows through a bypass filter position located between the first side and the second side of the filter; and
   a controller that controls the supply of unburned fuel to the filter while simultaneously preventing the switching operation of the valve from being performed,
   when the NOx absorbent is within a window of operating temperatures for effective NOx reduction.

2. A method for purifying an exhaust gas of an internal combustion engine, comprising:
   temporarily trapping a plurality of p articulates contained in an exhaust gas discharged from a combustion chamber with a filter and removing the particulates by oxidation;
   alternately switching a valve between a first flow passage to feed the exhaust gas to the first side of the filter and a second flow passage to feed the exhaust gas to the second side of the filter, during switching, the exhaust gas flows through a bypass filter position in which the exhaust gas bypasses the filter; and
   simultaneously controlling a supply of unburned fuel to the filter while preventing the switching of the valve,
   when the NOx absorbent is within a window of operating temperatures for effective NOx reduction.

3. An exhaust purifying apparatus of an internal combustion engine, comprising:
   a filter having a NOx absorbent and an active-oxygen discharging agent, the NOx absorbent absorbs NOx when the exhaust gas flowing into the NOx absorbent has a lean air-fuel ratio and discharges the absorbed NOx when an oxygen concentration in the exhaust gas flowing into the NOx absorbent is reduced, the active-oxygen discharging agent facilitates oxidation of a plurality of particulates, the filter temporarily traps the particulates contained in an exhaust gas;
   a valve having a switching operation that alternately switches between a first flow position to feed the exhaust gas to a first side of the filter and a second flow position to feed the exhaust gas to a second side of the filter, during switching, the exhaust gas flows through a bypass filter position located so as to bypass the filter; and
   a controller that provides control of an air-fuel ratio operation whereby the exhaust gas flows into the filter to a stoichiometric air-fuel ratio or a rich air-fuel ratio so as to discharge NOx from the NOx absorbent and provides control of the switching operation of the valve, the controller inhibits simultaneous control of the air-fuel ratio operation and the switching operation of the valve when the NOx absorbent is within a window of operating temperatures for effective NOx reduction.

4. The exhaust purifying apparatus according to claim 3, wherein the valve comprises:
   a switch valve for switching a flow direction of the exhaust gas flowing into the filter between a forward direction and a reverse direction.

5. A method for purifying an exhaust gas of an internal combustion engine, comprising:
   temporarily trapping a plurality of particulates contained in an exhaust gas with a filter having a NOx absorbent and an active-oxygen discharging agent, the NOx absorbent absorbs NOx when the exhaust gas flowing into the NOx absorbent has a lean air-fuel ratio and discharges the absorbed NOx when an oxygen concentration in the exhaust gas flowing into the NOx absorbent is reduced, the active-oxygen discharging agent facilitates oxidation of the particulates;
   alternatively switching a valve between a first flow position to feed the exhaust gas to a first side of the filter and a second flow position to feed the exhaust gas to a second side of the filter, during switching, the exhaust gas flows through a bypass filter position located between the first side and the second side of the filter; and
   inhibiting simultaneous control of the air-fuel ratio operation whereby the exhaust gas flows into the filter to a stoichiometric air-fuel ratio or a rich air-fuel ratio so as to discharge NOx from the NOx absorbent, and the switching operation of the valve, when the NOx absorbent is within a window of operating temperatures for effective NOx reduction.

6. The method for purifying an exhaust gas according to claim 5, wherein the alternately switching further comprises:
   switching the exhaust gas flow between a forward direction and a reverse direction.

7. An exhaust purifying apparatus of an internal combustion engine, comprising:
   a filter having a NOx absorbent and an active-oxygen discharging agent, both having at least one element selected from at least one of an alkali metal, an alkaline metal, rare earth elements, and a transition metal, the NOx absorbent absorbs NOx when the exhaust gas flowing into the NOx absorbent has a lean air-fuel ratio and discharges the absorbed NOx when an oxygen concentration in the exhaust gas flowing into the NOx absorbent is reduced, the active-oxygen discharging agent facilitates oxidation of a plurality of particulates, the filter temporarily traps the particulates contained in an exhaust gas;
   a valve having a switching operation that alternately switches between a first flow position to feed the exhaust gas to a first side of the filter and a second flow position to feed the exhaust gas to a second side of the filter, during switching, the exhaust gas flows through a bypass filter position located so as to bypass the filter; and
   a controller that provides control of an air-fuel ratio operation whereby the exhaust gas flows into the filter to a stoichiometric air-fuel ratio or a rich air-fuel ratio so as to discharge NOx from the NOx absorbent and provides control of the switching operation of the vale, the controller inhibits simultaneous control of the air-fuel ratio operation and the switching operation of the valve when the NOx absorbent is within a window of operating temperatures for effective NOx reduction.

8. The exhaust purifying apparatus according to claim 7, wherein the alkali metal is at least one of potassium (K), sodium (Na), lithium (Li), cesium (Cx) and rubidium (Rb).

9. The exhaust purifying apparatus according to claim 7, wherein the alkaline metal is at least one of barium (Ba), calcium (Ca) and strontium (Sr).

10. The exhaust purifying apparatus according to claim 7, wherein the rare earth metal is at least one of lanthanum (La) and yttrium (Y).

* * * * *